(12) United States Patent
Fujiwara et al.

(10) Patent No.: US 7,726,659 B2
(45) Date of Patent: Jun. 1, 2010

(54) STATIC PRESSURE TYPE NON-CONTACT GAS SEAL

(75) Inventors: Satoshi Fujiwara, Sanda (JP); Mitsuru Kudari, Sanda (JP); Masanobu Ninomiya, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 110 days.

(21) Appl. No.: 11/664,780

(22) PCT Filed: Jul. 15, 2005

(86) PCT No.: PCT/JP2005/013117

§ 371 (c)(1),
(2), (4) Date: Apr. 5, 2007

(87) PCT Pub. No.: WO2006/040865

PCT Pub. Date: Apr. 20, 2006

(65) Prior Publication Data

US 2008/0111315 A1    May 15, 2008

(30) Foreign Application Priority Data

Oct. 8, 2004    (JP)    ............................. 2004-296341

(51) Int. Cl.
*F16J 15/34*    (2006.01)
(52) U.S. Cl. .................. 277/387; 277/401; 277/408
(58) Field of Classification Search ................ 277/387, 277/401, 408
See application file for complete search history.

(56) References Cited

U.S. PATENT DOCUMENTS 3,015,506 A * 1/1962 Tracy ......................... 277/388
3,033,577 A * 5/1962 Spiess ........................ 277/401
3,034,797 A * 5/1962 Pike ........................... 277/317

(Continued)

FOREIGN PATENT DOCUMENTS

JP    62-37573    2/1987

(Continued)

*Primary Examiner*—Alison K Pickard
(74) *Attorney, Agent, or Firm*—William L. Androlia; H. Henry Koda

(57) ABSTRACT

The present invention provides a static pressure type non-contact gas seal which, even when supply of seal gas 6 to the space between sealing end surfaces 3a and 4a has stopped unexpectedly, can be safely used with no possibility that the sealing end surfaces 3a and 4a collide severely against each other and consequently the sealing end surfaces 3a and 4a are damaged or destructed. In this static pressure type non-contact gas seal, the seal gas 6 is supplied to the space between the sealing end surfaces 3a and 4a from a seal gas passage 5, thereby generating an opening force that acts on the stationary sealing ring 4 in a direction that the space between the sealing end surfaces 3a and 4a is opened. An annular-spaced back pressure chamber 25 blocked by two O-rings 12 and 13 is formed between the facing peripheral surfaces of a seal case 1 and the stationary sealing ring 4, to introduce the seal gas 6 to be supplied to the seal gas passage 5 into the back pressure chamber 25, thereby generating a closing force that maintain the balance with the opening force, as a back pressure acting on the stationary sealing ring 4. A spring is not used as a means for generating the closing force.

2 Claims, 18 Drawing Sheets

U.S. PATENT DOCUMENTS

| | | | |
|---|---|---|---|
| 3,479,040 A * | 11/1969 | Tracy | 277/391 |
| 3,486,760 A * | 12/1969 | Tracy | 277/370 |
| 4,523,764 A * | 6/1985 | Albers et al. | 277/400 |
| 5,820,129 A * | 10/1998 | Reagan | 277/314 |
| 6,131,912 A * | 10/2000 | Azibert et al. | 277/358 |
| 6,135,458 A * | 10/2000 | Fuse | 277/401 |
| 6,431,551 B1 * | 8/2002 | Fuse et al. | 277/390 |
| 6,557,856 B1 * | 5/2003 | Azibert et al. | 277/401 |
| 7,201,238 B2 * | 4/2007 | Marvin et al. | 175/67 |
| 2001/0010416 A1 * | 8/2001 | Wu et al. | 277/387 |
| 2002/0079648 A1 * | 6/2002 | Uth | 277/401 |

FOREIGN PATENT DOCUMENTS

| | | |
|---|---|---|
| JP | 2-146374 | 6/1990 |
| JP | 2-92169 | 7/1990 |
| JP | 3-277874 | 12/1991 |
| JP | 4-48469 | 4/1992 |
| JP | 11-287330 | 10/1999 |
| JP | 2000-329238 | 11/2000 |
| WO | WO 99/27281 | 6/1999 |

* cited by examiner (A)

(B)

STATIC PRESSURE TYPE NON-CONTACT GAS SEAL

TECHNICAL FIELD

The present invention relates to a pressure contact type non-contact seal gas suitably used in rotary apparatuses, such as turbines, blowers, compressors, agitators, and rotary turbines that deal with various gases, such as toxic gases, flammable gases, explosive gases, and power-mixed gases.

BACKGROUND ART

As conventional static pressure type non-contact gas seals, a static pressure type non-contact gas seal configured as below is known (for example, refer to Patent Document 1). That is, the static pressure type non-contact gas seal includes a tubular seal case; a rotary sealing ring fixed to a rotary member; a stationary sealing ring held in an inner peripheral surface of the seal case so as to be axially movable in a state in which it faces the rotary sealing ring; an opening force generating means that supplies seal gas to the space between sealing end surfaces as facing end surfaces of both the sealing rings, from a joined seal gas passage passing through the seal case and the stationary sealing ring, to thereby generate an opening force acting on the stationary sealing ring in a direction in which the space between the sealing end surfaces is opened; and a closing force generating means that generates a closing force acting on the stationary sealing ring in a direction in which the space between the sealing end surfaces is closed with a biasing force generated by a spring interposed between the seal case and stationary sealing ring. The balance of an opening force acting on the stationary sealing ring in which the space between the sealing end surfaces is opened, an opening force generated by the opening force generating means, and a closing force generated by the closing force generating means is maintained by a pressure of a sealed fluid acting on a portion of an outer peripheral surface of the stationary sealing ring that faces a sealed fluid region excluding the sealed end surfaces so that the sealing end surfaces are kept in a mutual non-contact state.

Specifically, in the static pressure type non-contact gas seal (hereinafter referred to as "conventional gas seal") having such a configuration, the sealing end surfaces are kept in a mutual non-contact state in which an opening force (an opening force resulting from a pressure (static pressure) of the seal gas introduced between the sealing end surfaces (according to the shape, etc. of the stationary sealing, further including an opening force resulting from a pressure of the sealed fluid acting on the portion of the outer peripheral surface of the stationary sealing ring that faces the sealed fluid region excluding the sealing end surfaces)) acting on the stationary sealing ring in a direction in which the space between the sealing end surfaces is opened is balanced with a closing force (a closing force generated by a spring that presses and biases the stationary sealing ring toward the rotary sealing ring) acting on the stationary sealing ring in a direction in which the space between the sealing end surfaces is closed. Here, the pressure of the seal gas introduced into sealing end surfaces is set to be higher than the pressure of the sealed fluid region so as to vary according to this pressure, and the spring force (spring load) of the spring that determines the closing force is set according to the pressure of the seal gas so that the gap between the sealing end surfaces is set appropriately (generally, 5 to 15 μm).

Thus, similar to a dynamic pressure type non-contact gas seal in which the sealing end surfaces are kept in a mutual non-contact state by generating a dynamic pressure resulting from the sealed fluid in the space between the sealing end surfaces, the conventional gas seal can keep the sealing end surfaces in a mutual non-contact state to seal the sealed fluid well for a prolonged period of time without causing seizing of the sealing end surfaces. Moreover, the conventional gas seal can also satisfactorily seal the gases, which could not be sealed by the dynamic pressure type non-contact gas seal, and thus it can has wide applications as compared with the dynamic pressure type non-contact gas seal. Specifically, the dynamic pressure type non-contact gas seal, as widely known, is configured such that a dynamic pressure generating groove is formed in one of sealing end surfaces that rotates relative to each other, and a dynamic pressure resulting from a sealed fluid is generated between the sealing end surfaces by the action of the dynamic pressure generating groove, thereby keeping the sealing end surfaces in a mutual non-contact state. Basically, the dynamic pressure type non-contact gas seal allows the sealed fluid to leaks to the outside of an apparatus from the space between sealing end surfaces. Accordingly, in a case in which the sealed fluid is a fluid, such as a toxic gas, an inflammable gas, or an explosive gas, having the property that does not allows leaking to the outside, the dynamic pressure type non-contact gas seal cannot be used. In contrast, in the conventional gas seal that is a static pressure type non-contact gas seal, the seal gas is jetted toward the sealed fluid region (and non-sealed fluid region) from the space between the sealing end surfaces. Therefore, even in rotary apparatuses which deal with gases, such as toxic gases, flammable gases, and explosive gases, which do not allow leaking, the conventional gas seal can be suitably used.

Patent Document 1: Japanese Patent Application Publication No. 2000-329238 (FIG. 1)

However, in the conventional gas seal, if supply of the seal gas to the space between the sealing end surfaces has stopped due to certain factors (failure, erroneous operation, and the like of a seal gas supply system) during operation (or during driving of a rotary shaft) of a rotary apparatus equipped with the gas seal, the following problems will occur.

That is, in the conventional gas seal, since the spring is used as the closing force generating means, a closing force generated by the spring acts at all times. Accordingly, as described above, if supply of the seal gas has stopped unexpectedly and thereby a closing force resulting from the seal gas vanishes, the stationary sealing ring is suddenly moved to the rotary sealing ring by the biasing force (closing force) of the spring, and collides severely against the rotary sealing ring. As a result, there is a possibility that the sealing end surfaces may be damaged or destructed. This problem becomes remarkable, particularly under high-pressure conditions in which the pressure of the sealed fluid is high. Specifically, under the high-pressure conditions, the pressure of the seal gas is required to be set higher according to the pressure of the sealed fluid. Therefore, the load of the spring to be balanced with an opening force resulting from the seal gas is also compelled to be increased. Accordingly, when supply of the seal gas has stopped, the stationary sealing ring collides extremely severely against the rotary sealing ring, and therefore the damage or destruction of the sealing end surfaces is increased.

The invention has been finalized in consideration of the above-described problems, and it is the object of the invention to provide a static pressure type non-contact gas seal which, even when supply of seal gas to the space between sealing end surfaces has stopped unexpectedly, can be safely used with no possibility that the sealing end surfaces collide severely against each other and consequently the sealing end surfaces are damaged or destructed.

DISCLOSURE OF THE INVENTION

According to an aspect of the invention, a static pressure type non-contact gas seal includes: a tubular seal case; a rotary sealing ring fixed to a rotary member; a stationary sealing ring held in the seal case so as to be axially movable in a state in which the stationary sealing ring faces the rotary sealing ring; an opening force generating means that generates an opening force acting on the stationary sealing ring in a direction in which the space between the sealing end surfaces is opened by supplying seal gas to the space between sealing end surfaces serving as facing end surfaces of both the sealing rings, from a joined seal gas passage passing through the seal case and the stationary sealing ring; and a closing force generating means that generates a closing force acting on the stationary sealing ring in a direction in which the space between the sealing end surfaces is closed, so as to keep the sealing end surfaces in a non-contact state by a balance of the opening force and closing force. In other to achieve the above object, in particular, the closing force generating means, which does not use a spring, includes an annular-spaced back pressure chamber which is formed between the facing peripheral surfaces of the seal case and the stationary sealing ring and blocked by two O-rings, the back pressure chamber being so that a portion of the seal gas to be supplied to the seal gas passage or a portion of the seal gas flowing through the seal gas passage is introduced into the back pressure chamber to cause the closing force to be generated as a back pressure resulting from the seal gas acting on the stationary sealing ring.

In the static pressure type non-contact gas seal according to the aspect of the invention, preferably, the seal gas passage includes an annular-spaced communication space which is formed between the facing peripheral surfaces of the seal case and the stationary sealing ring and blocked by the two O-rings mounted between the facing peripheral surfaces, a case-side passage that passes through the seal case and has an upstream end connected to the seal gas supply passage and a downstream end opened to the communication space, a static pressure generating groove that is formed in the sealing end surface of the stationary sealing ring, a sealing ring-side passage that passes through the stationary sealing ring and has an upstream end opened to the communication space and a downstream end opened to the static pressure generating groove, and a throttle that is disposed in the sealing ring-side passage. The communication space can also be used as the back pressure chamber of the seal gas passage. In a case in which the communication is not used as the communication passage, preferably, first, second and third O-rings are disposed between the facing peripheral surfaces of the seal case and the stationary sealing ring, and the communication space of the seal gas passage and the back pressure chamber are formed between the facing peripheral surfaces, respectively, the communication space being blocked by the first and second O-rings and the back pressure chamber being blocked by the second and third O-rings, so that the portion of the seal gas to be supplied to the seal gas passage from the seal gas supply passage is introduced into the back pressure chamber. Further, preferably, an auxiliary back pressure chamber is formed between the facing peripheral surfaces of the seal case and of the stationary sealing ring, the auxiliary back pressure chamber being blocked by two O-rings and divided from the back pressure chamber, and a through hole that communicates with a sealed fluid region and the auxiliary back pressure chamber is formed in the stationary sealing ring, so that a closing force pressing the stationary sealing ring toward the rotary sealing ring is generated by a pressure of the sealed fluid introduced into the auxiliary back pressure chamber from the through hole. Further, an elastic member that biases the stationary sealing ring away from the rotary sealing ring is interposed between the seal case and the stationary sealing ring, so that the rotary sealing ring is prevented from moving rapidly toward when supply of the seal gas stops. As the elastic member, a spring or an O-ring is preferable. In case in which such a elastic member is not provided, a pressure keeping chamber that generates a resistance force preventing the stationary sealing ring from moving toward the rotary sealing ring by introducing the seal gas thereinto is formed between the facing peripheral surfaces of the seal case and the stationary sealing ring, and a seal gas introducing passage is formed in the stationary sealing ring, the seal gas introducing passage communicating with the pressure keeping chamber and the back pressure chamber or the communication space and having a throttle disposed therein, so that the stationary sealing ring is prevented from moving rapidly toward the rotary sealing ring when supply of the seal gas stops. Moreover, a dynamic pressure generating groove is formed in the sealing end surface of the rotary sealing ring so that a dynamic pressure generated by the dynamic pressure generating groove in addition to a static pressure due to the seal gas acts on the space between the sealing end surfaces.

According to the static pressure type non-contact gas seal according to the aspects of the invention, since a back pressure resulting from the seal gas introduced the sealing end surfaces from a seal gas supply system is caused to function as a closing force without using a spring as the opening force generating means, even when supply of the seal gas to the space between sealing end surfaces has stopped unexpectedly due to a cause, an opening force generated by the opening force generating means and a closing force generated by the closing force generating means vanish simultaneously. Therefore, the sealing end surfaces do not collide severely against each other and consequently the sealing end surfaces will be damaged or destructed.

Figure 1:
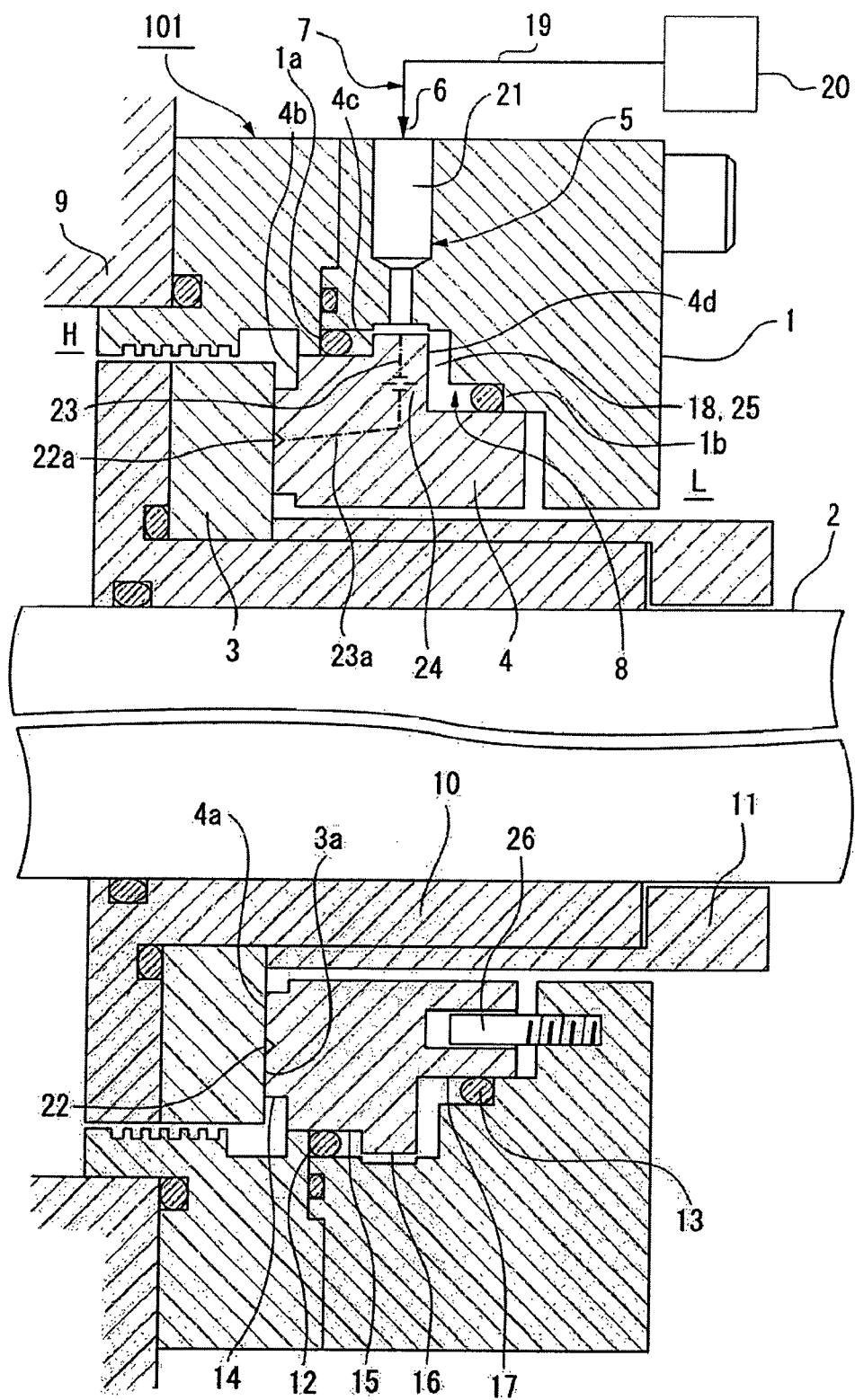
FIG. 1 is a longitudinal sectional side view showing a first gas seal.

REFERENCE NUMERALS 1 seal case
2 rotary shaft (rotary member)
3 rotary sealing ring
3a sealing end surface of rotary sealing ring
4 stationary sealing ring
4a sealing end surface of stationary sealing ring
5 seal gas passage
6 seal gas
7 opening force generating means
8 closing force generating means
12 first O-ring
13 second O-ring
18 communication space
19 seal gas supply passage
20 seal gas supply device
21 case-side passage
22 static pressure generating groove
23 sealing ring-side passage
24 throttle
25 back pressure chamber
28 third O-ring
30 pressure-keeping chamber
31 throttle
32 seal gas introducing passage
34 spring (elastic member)
35 O-ring (elastic member)
37 auxiliary back pressure chamber
38 through hole
41 dynamic pressure generating groove
101 first gas seal (static pressure type non-contact gas seal)
102 second gas seal (static pressure type non-contact gas seal)
103 third gas seal (static pressure type non-contact gas seal)
104 fourth gas seal (static pressure type non-contact gas seal)
105 fifth gas seal (static pressure type non-contact gas seal)
106 sixth gas seal (static pressure type non-contact gas seal)
107 seventh gas seal (static pressure type non-contact gas seal)
108 eighth gas seal (static pressure type non-contact gas seal)
109 ninth gas seal (static pressure type non-contact gas seal)
110 tenth gas seal (static pressure type non-contact gas seal)
111 eleventh gas seal (static pressure type non-contact gas seal)
112 twelfth gas seal (static pressure type non-contact gas seal)
113 thirteenth gas seal (static pressure type non-contact gas seal)
202: rotary table (rotary member)
H sealed fluid region
L non-sealed fluid region

BEST MODE FOR CARRYING OUT THE INVENTION

Figure 2:
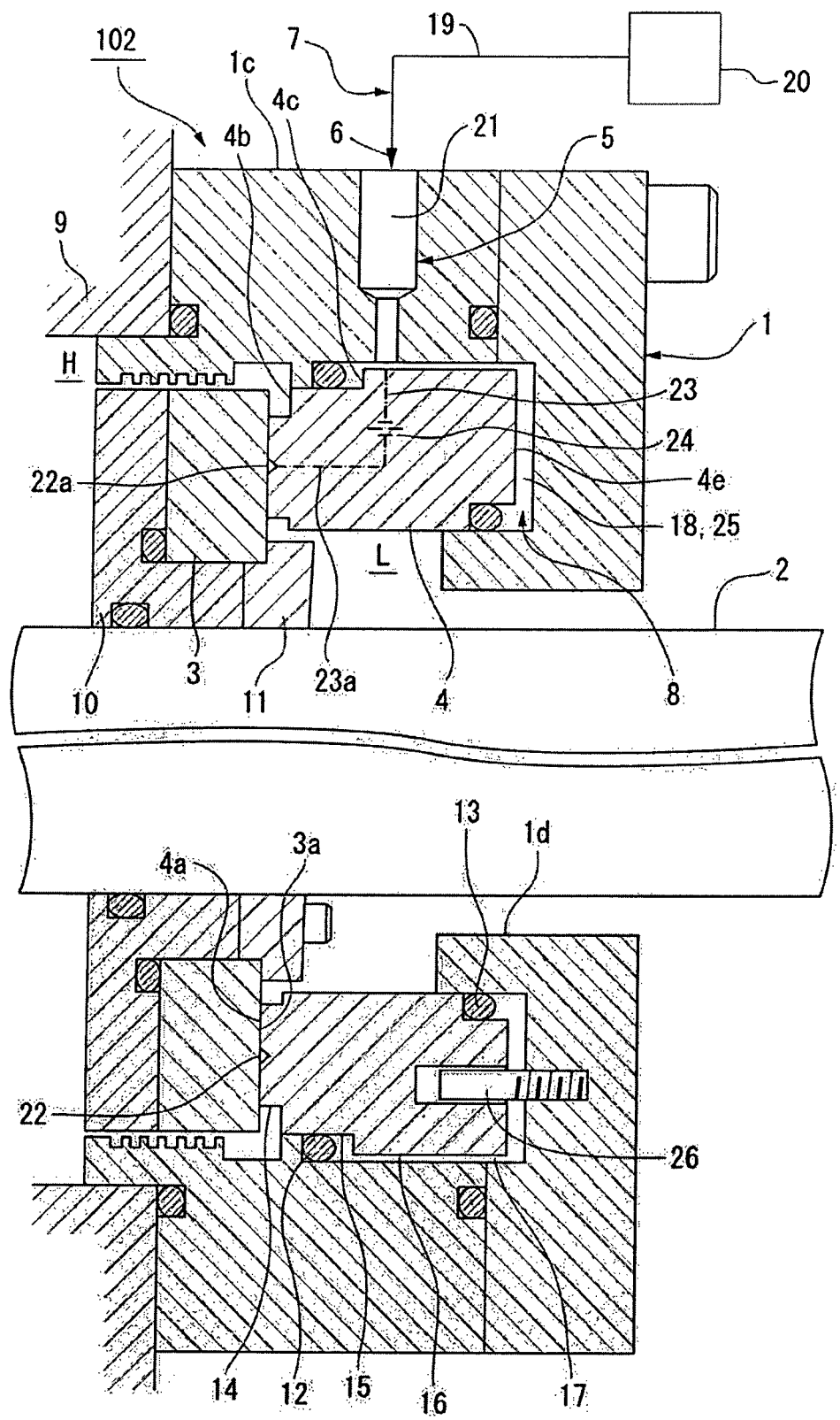
FIG. 2 is a longitudinal sectional side view showing a second gas seal.
Figure 3:
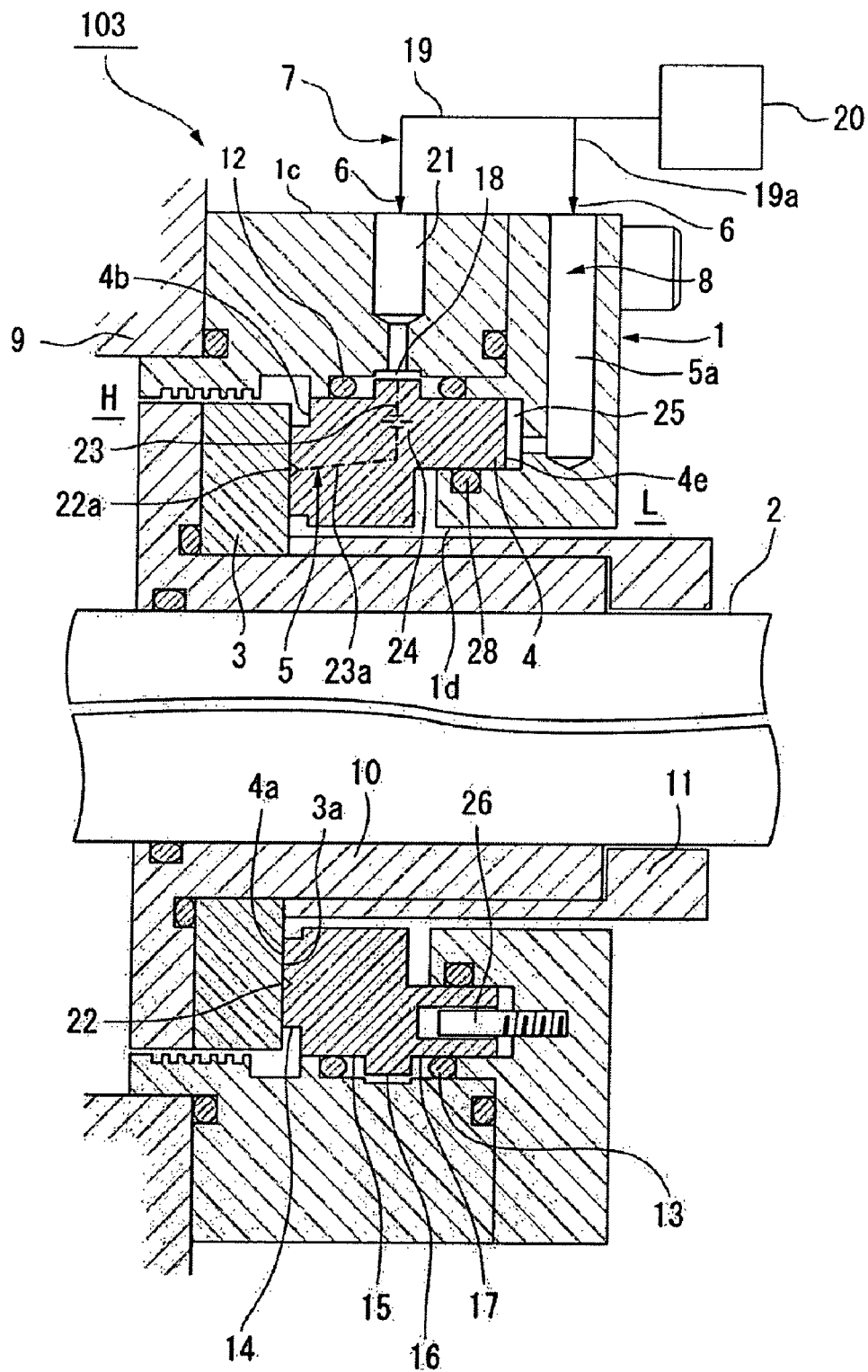
FIG. 3 is a longitudinal sectional side view showing a third gas seal.
Figure 4:
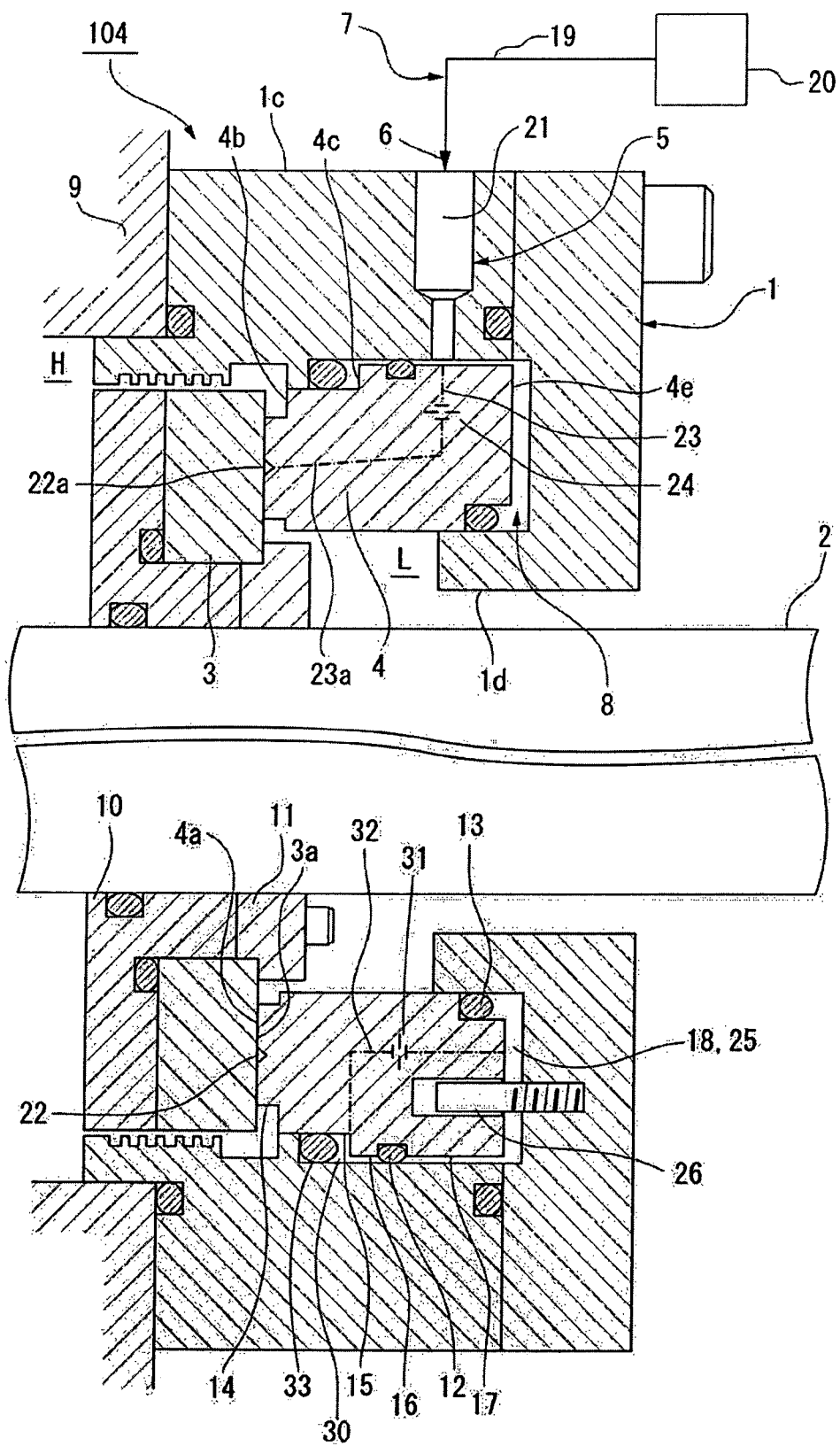
FIG. 4 is a longitudinal sectional side view showing a fourth gas seal.
Figure 5:
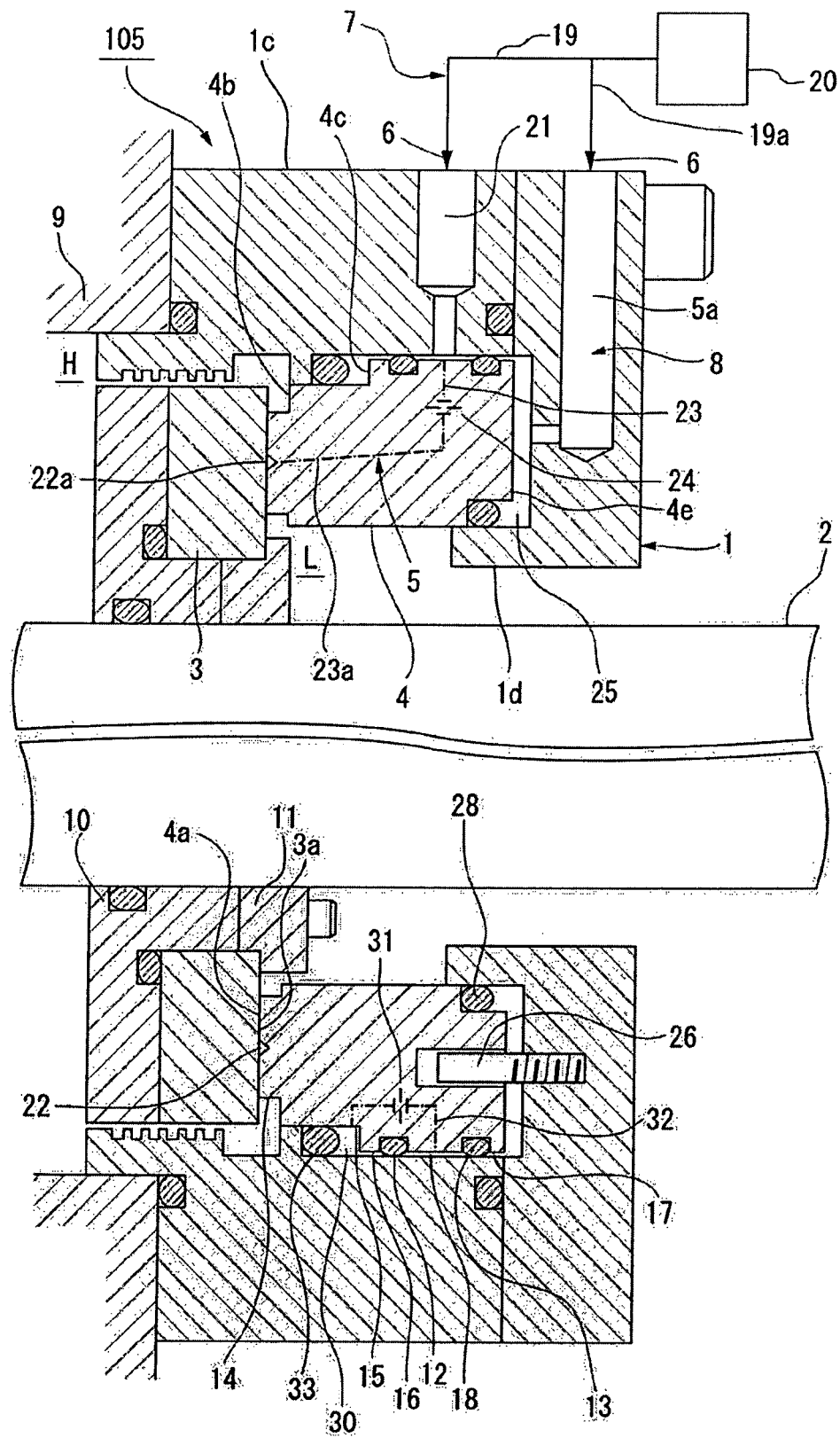
FIG. 5 is a longitudinal sectional side view showing a fifth gas seal.
Figure 6:
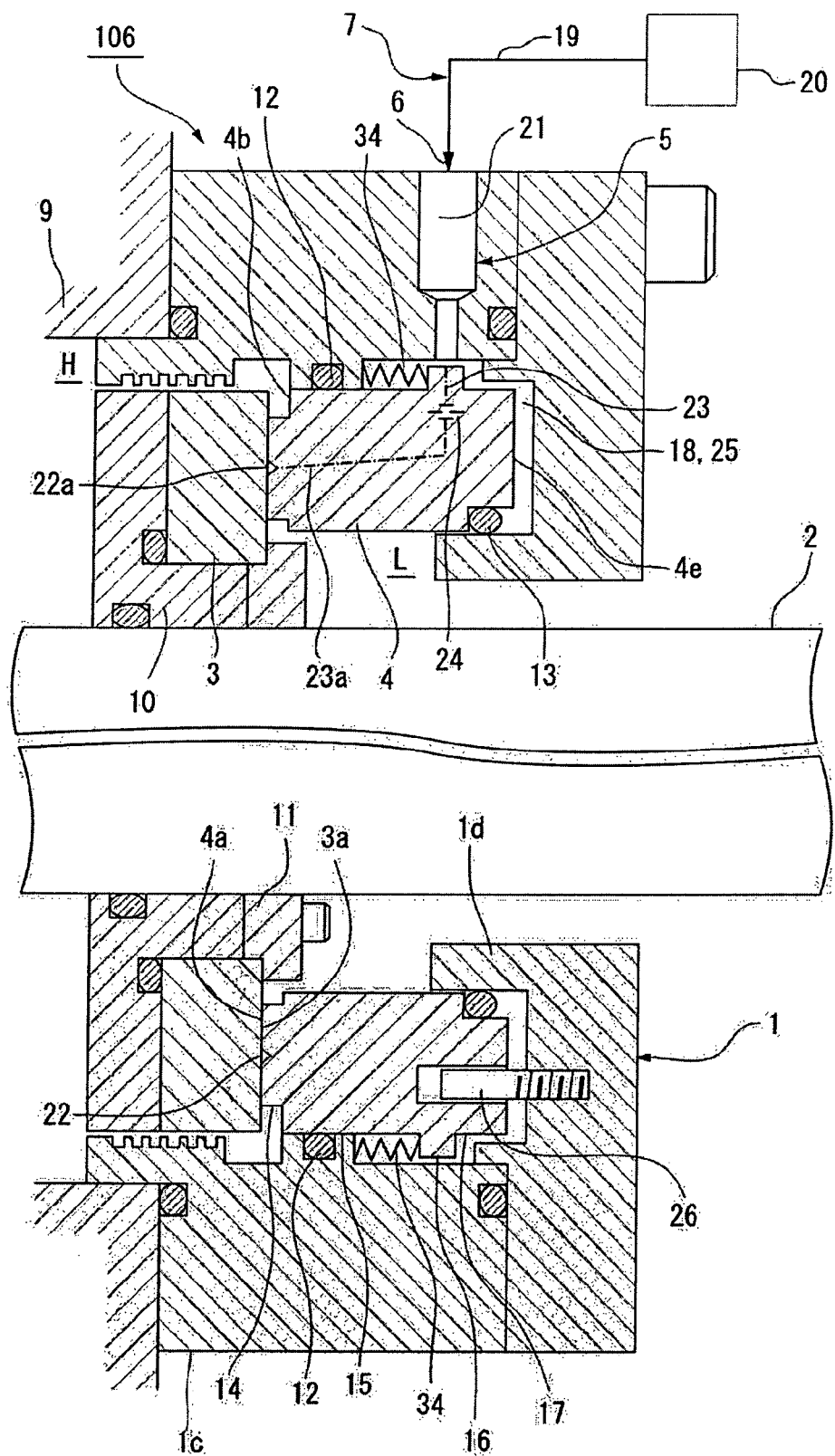
FIG. 6 is a longitudinal sectional side view showing a sixth gas seal.
Figure 7:
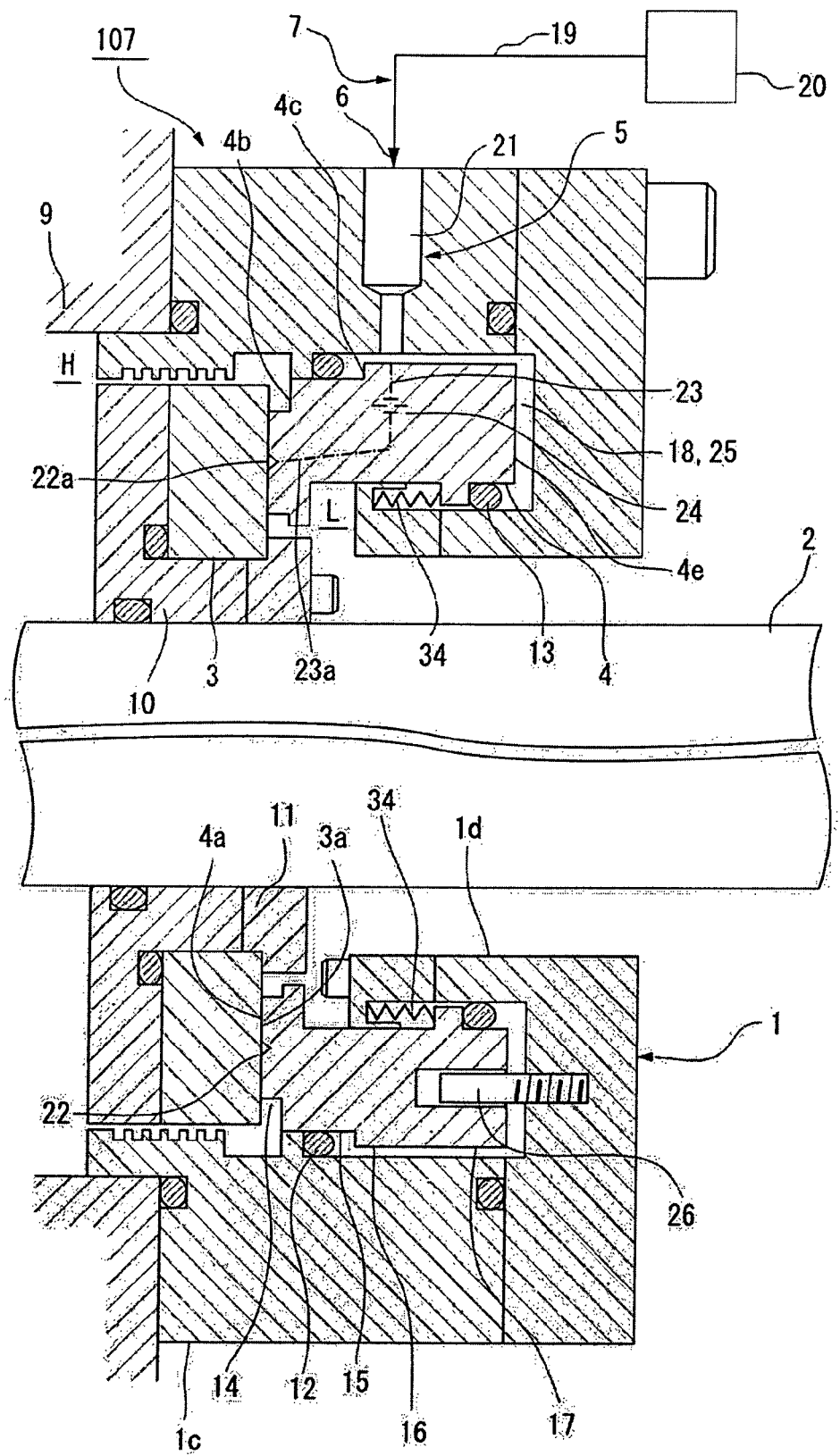
FIG. 7 is a longitudinal sectional side view showing a first gas seal.
Figure 8:
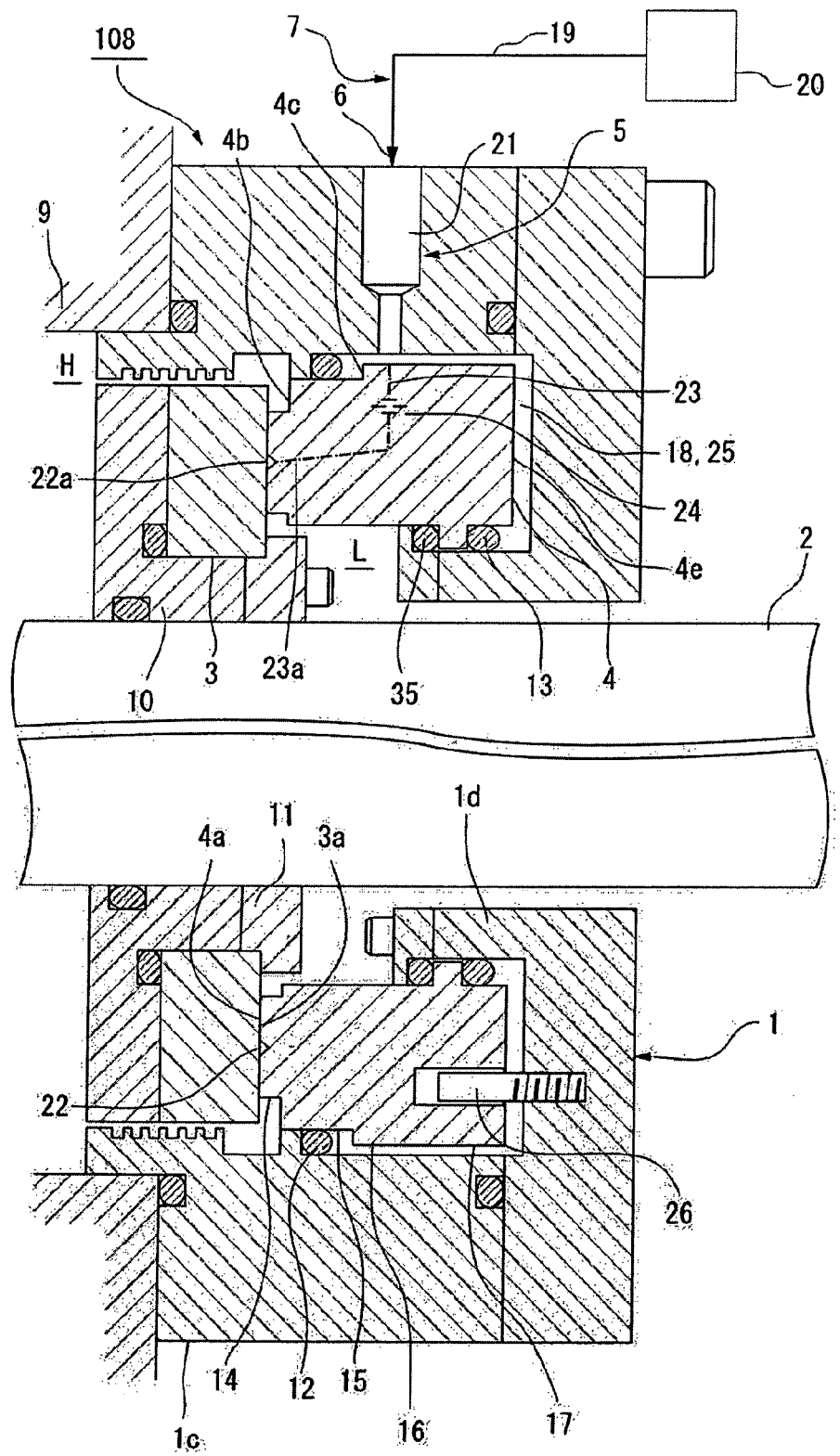
FIG. 8 is a longitudinal sectional side view showing an eighth gas seal.
Figure 9:
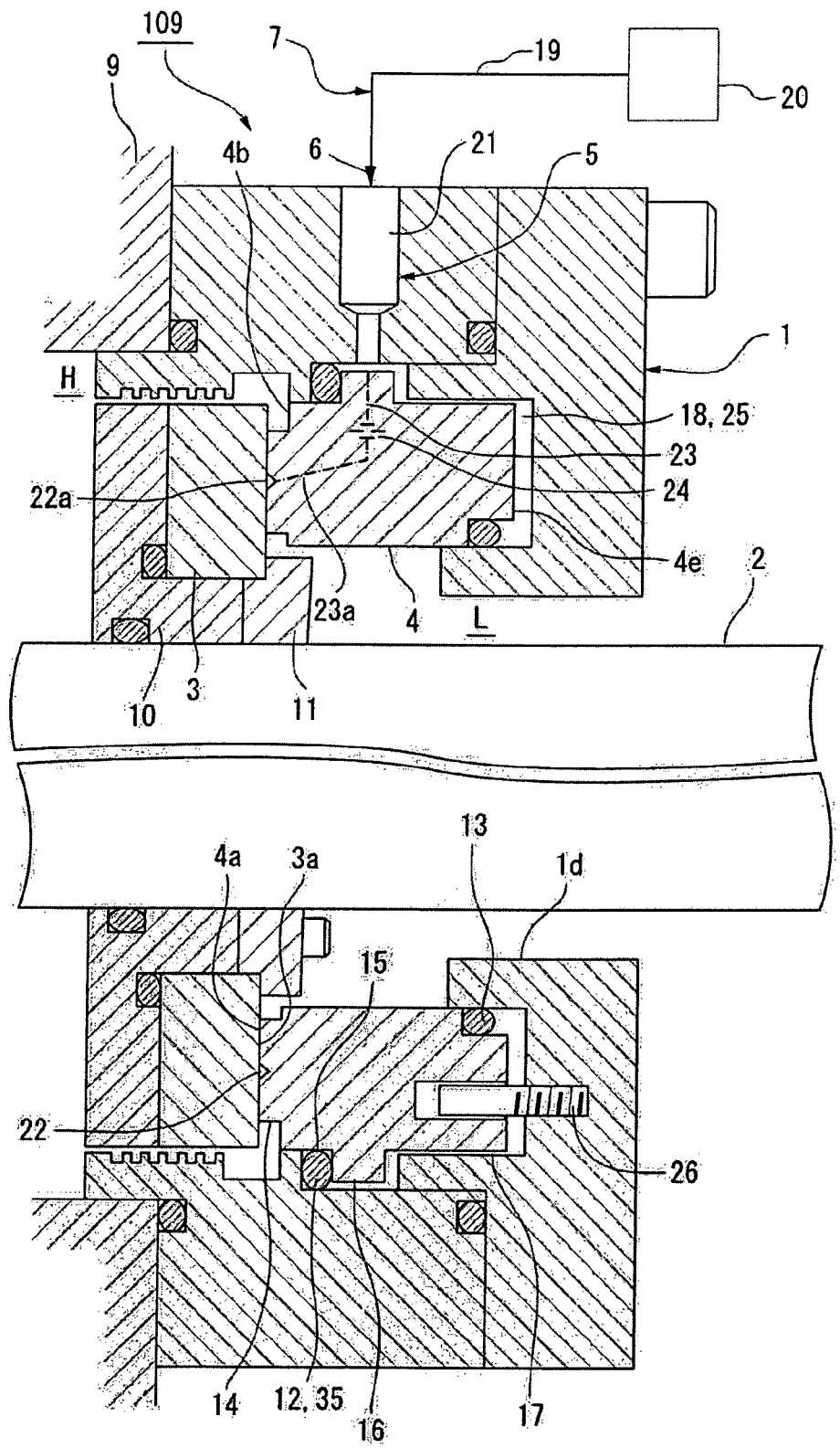
FIG. 9 is a longitudinal sectional side view showing a ninth gas seal.
Figure 10:
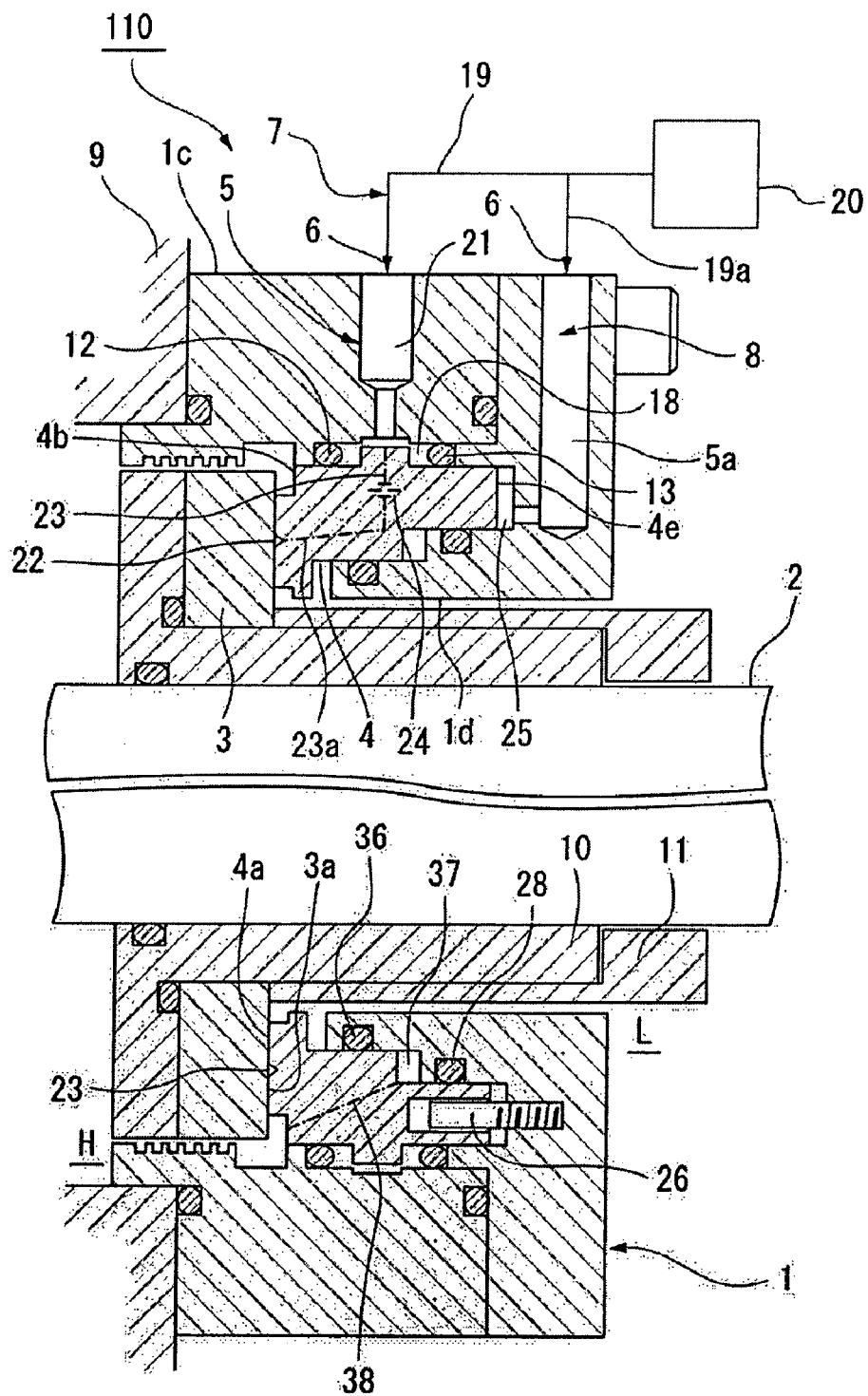
FIG. 10 is a longitudinal sectional side view showing a tenth gas seal.
Figure 11:
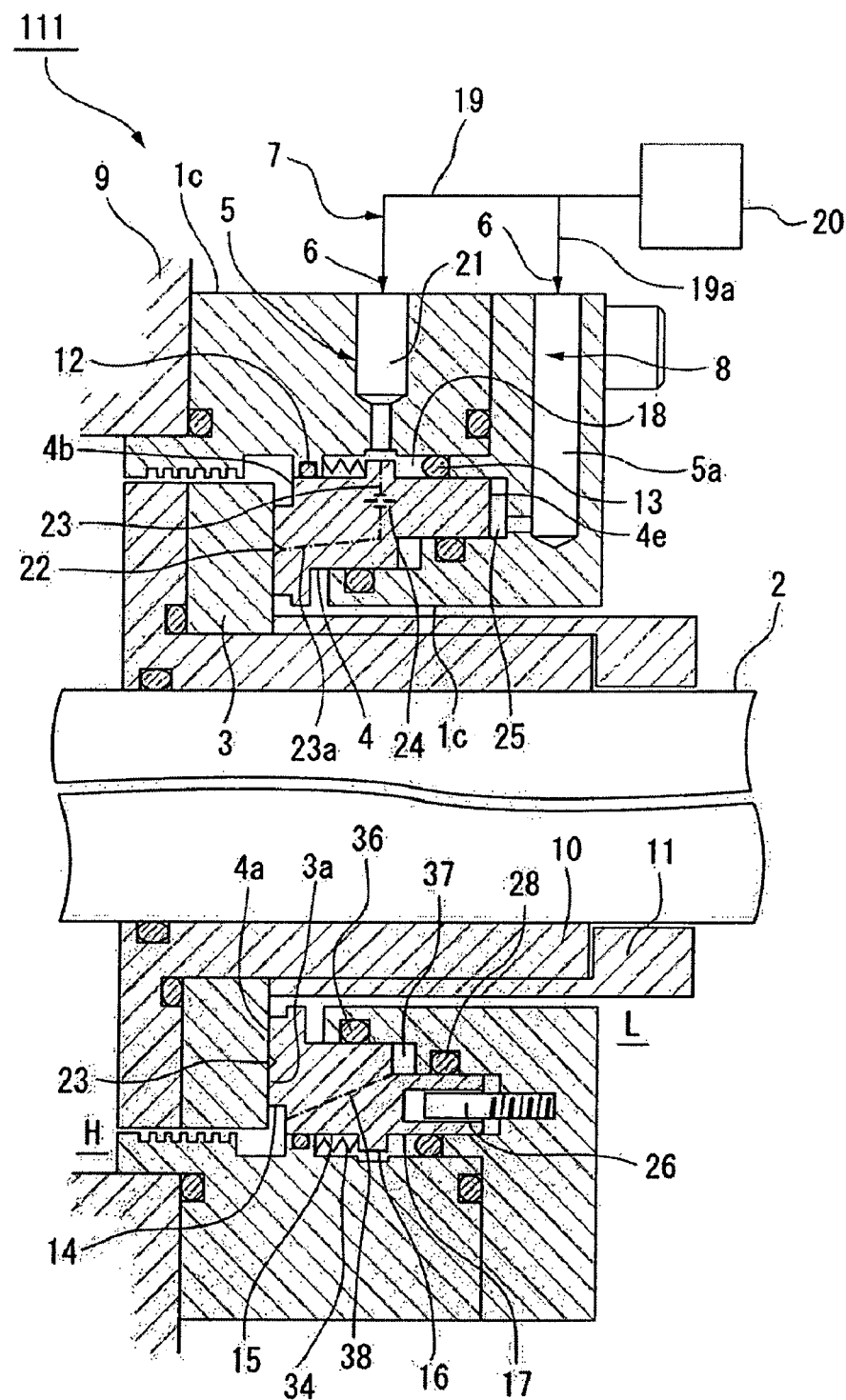
FIG. 11 is a longitudinal sectional side view showing an eleventh gas seal.
Figure 12:
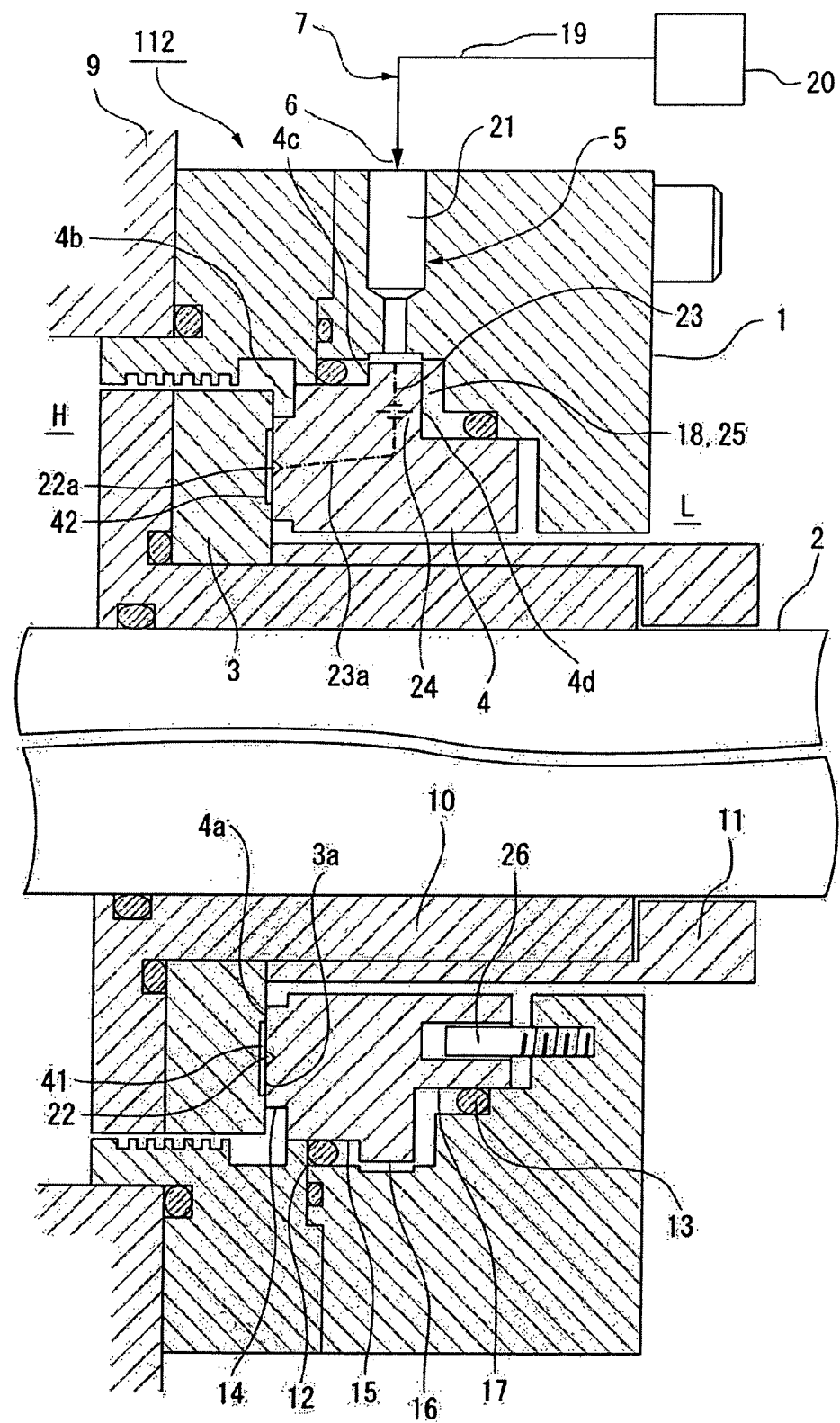
FIG. 12 is a longitudinal sectional side view showing a twelfth gas seal.
Figure 13:
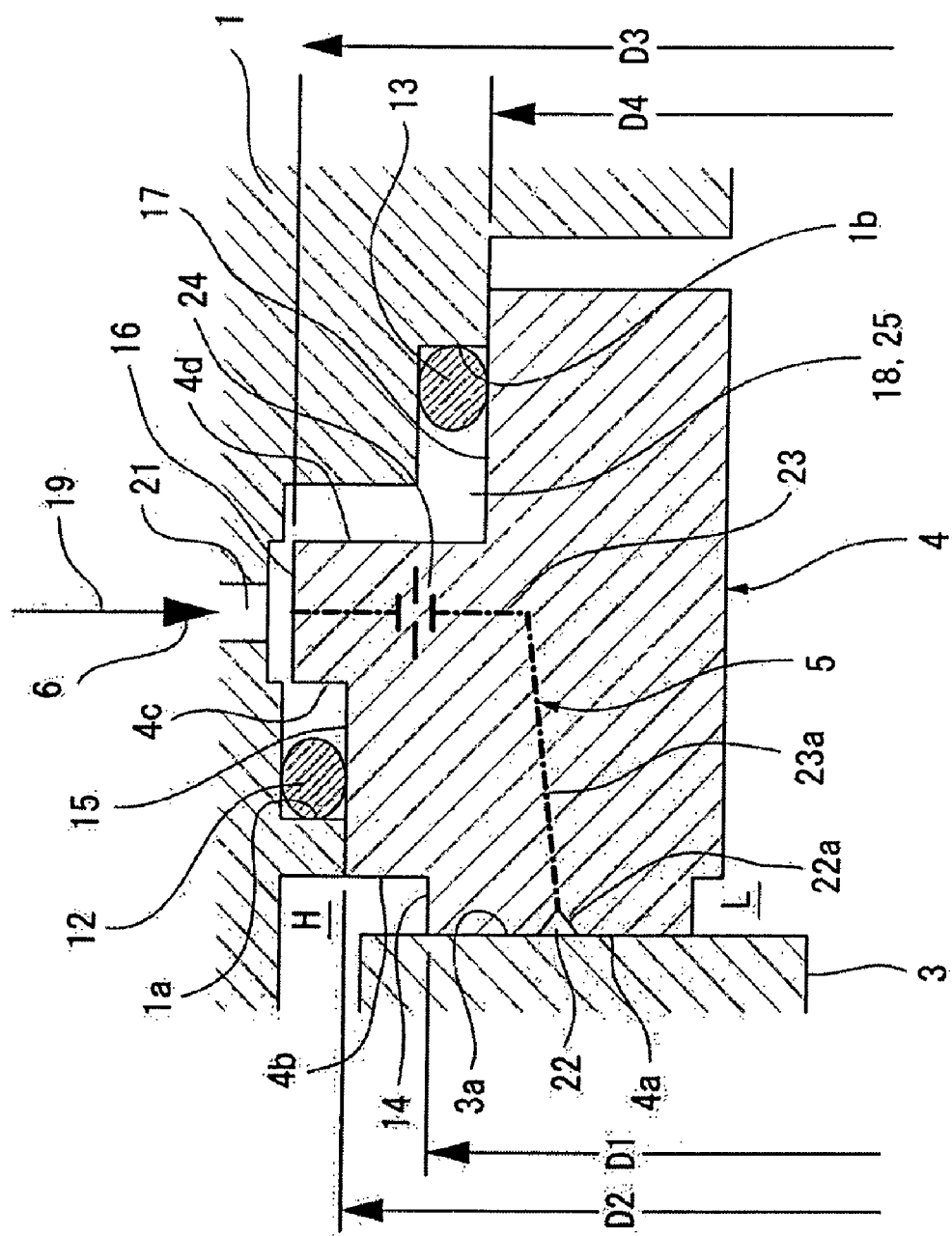
FIG. 13 is an enlarged longitudinal sectional side view of main parts of the first gas seal.
Figure 14:
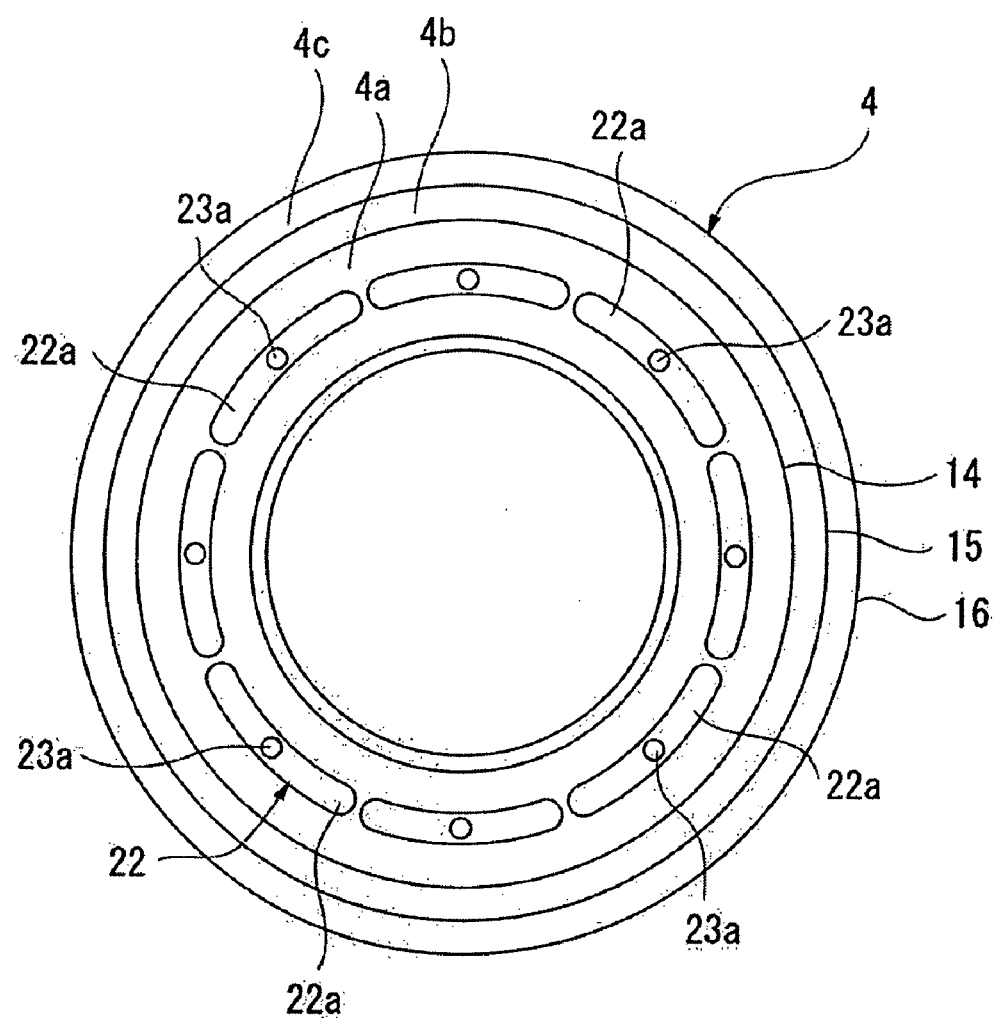
FIG. 14 is a front view showing a stationary sealing ring of the first seal.
Figure 15:
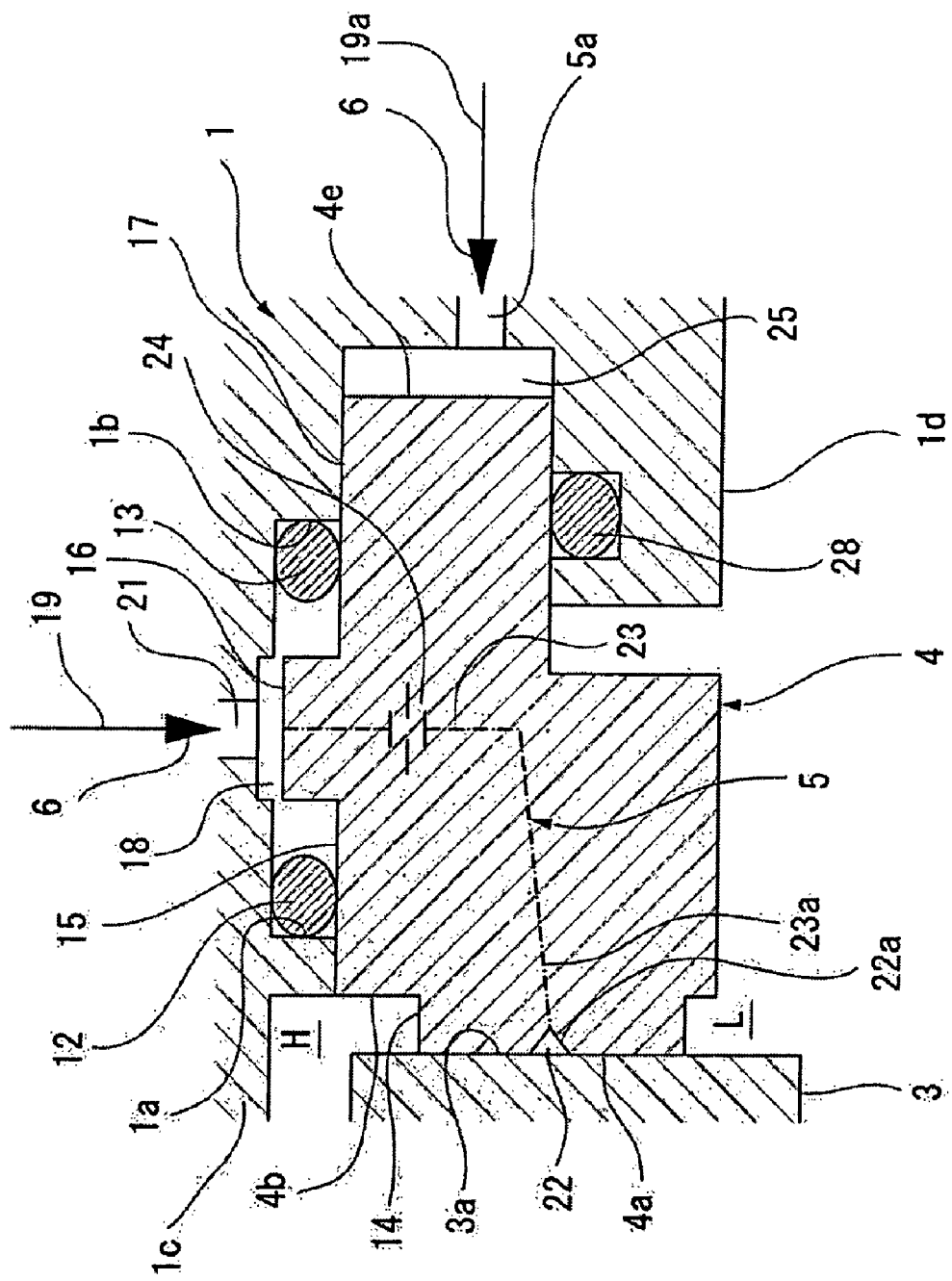
FIG. 15 is an enlarged longitudinal sectional side view of main parts of the third gas seal.
Figure 16:
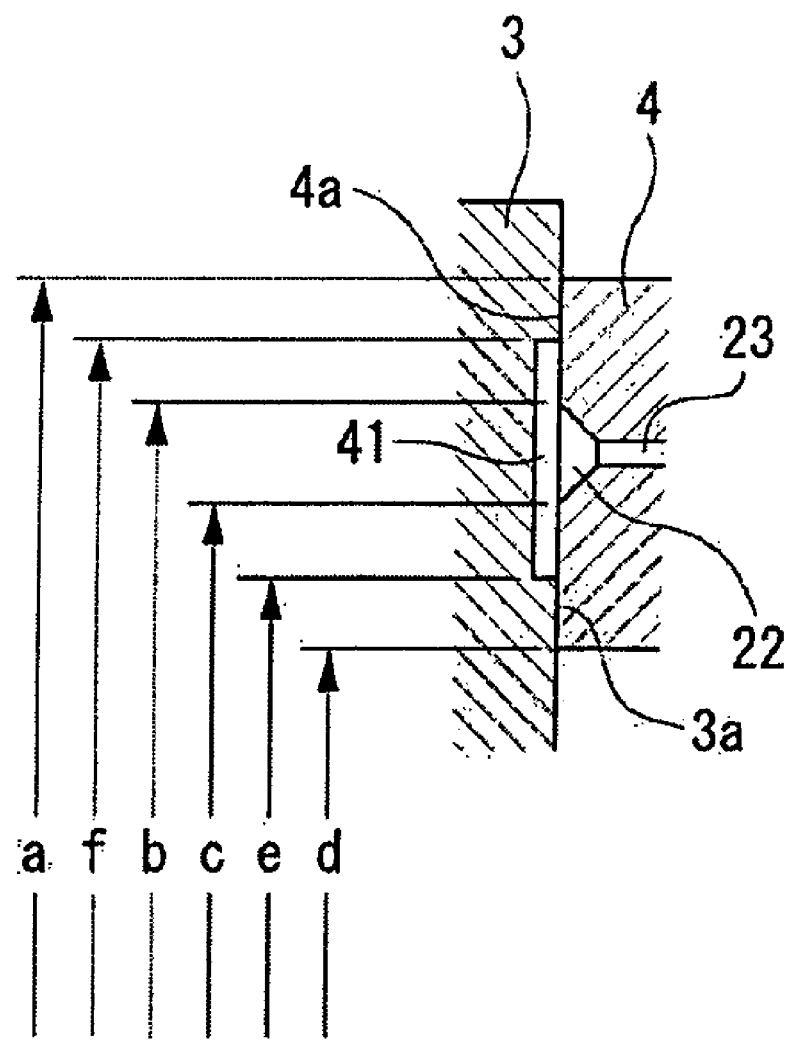
FIG. 16 is an enlarged longitudinal sectional side view of main parts of the twelfth gas seal.
Figure 17:
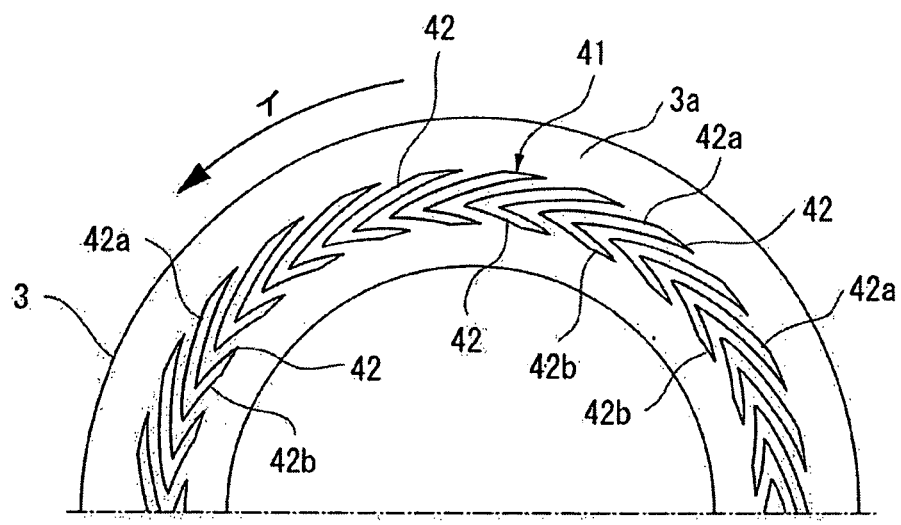
FIG. 17 is a half-cut front view showing a rotary sealing ring of the twelfth gas seal.
Figure 17:
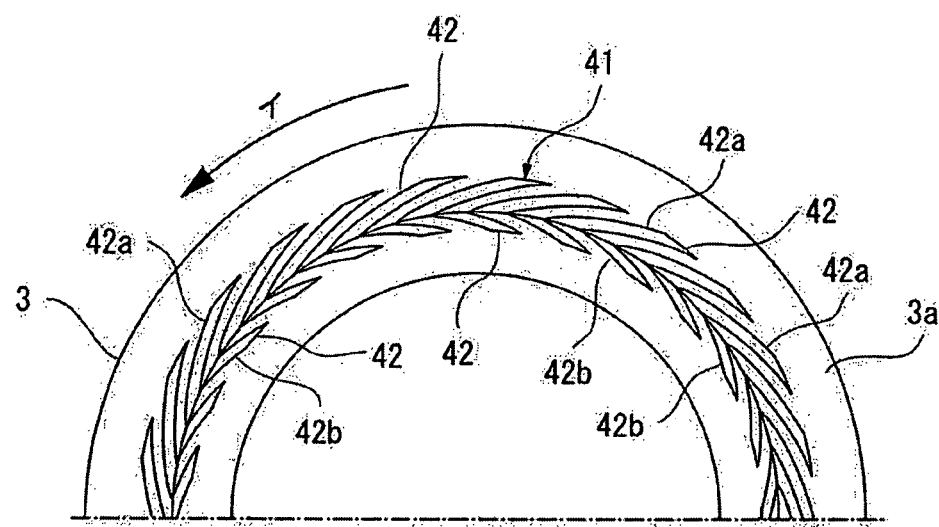
Figure 18:
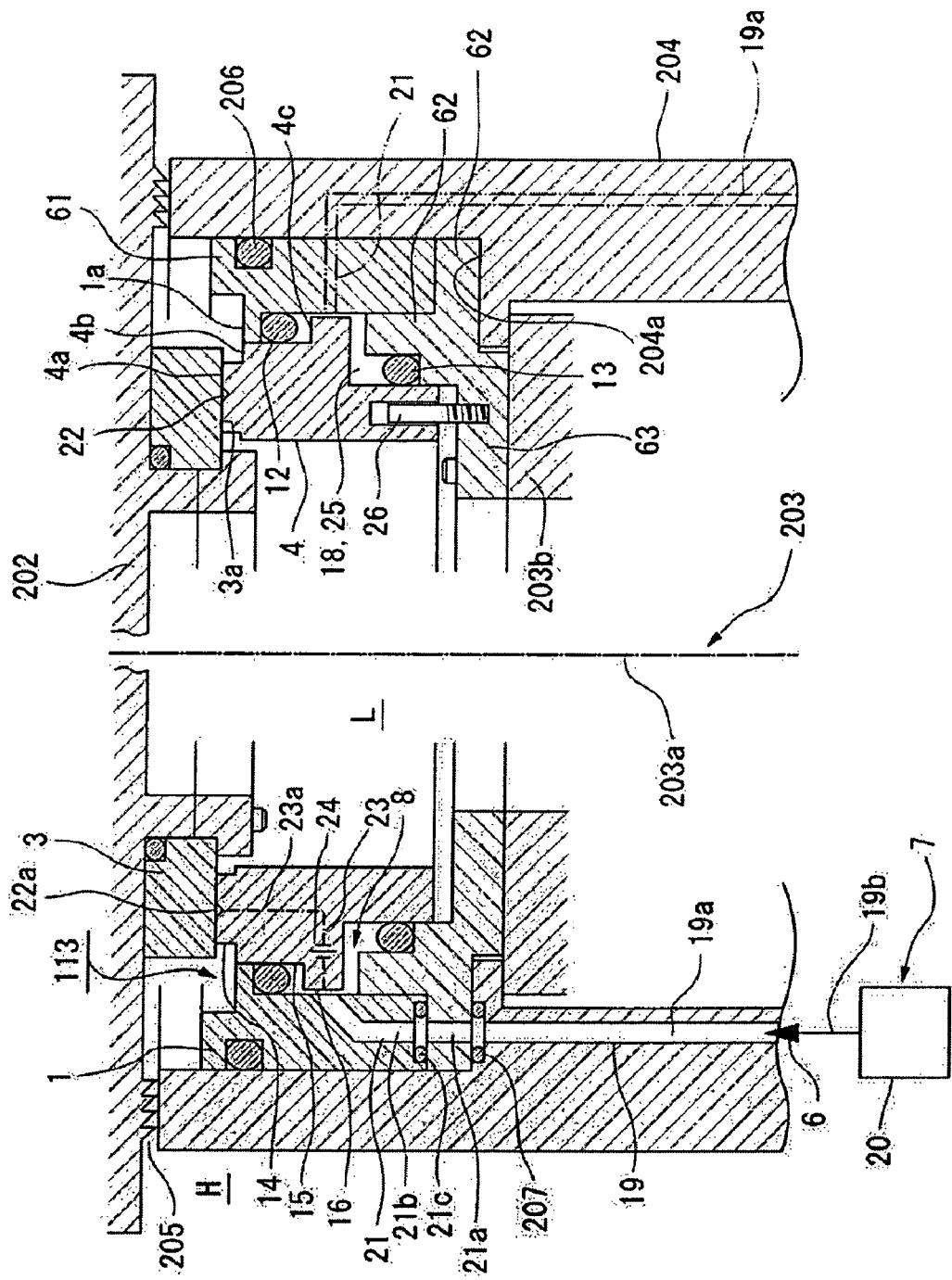
FIG. 18 is a longitudinal sectional side view showing a thirteenth gas seal.

FIGS. 1 to 12 and FIG. 18 show static pressure type non-contact gas seals, respectively, of the invention. Hereinafter, a static pressure type non-contact gas seal shown in FIG. 1 is referred to as "first gas seal 101," a static pressure type non-contact gas seal shown in FIG. 2 is referred to as "second gas seal 102," a static pressure type non-contact gas seal shown in FIG. 3 is referred to as "third gas seal 101," a static pressure type non-contact gas seal shown in FIG. 4 is referred to as "fourth gas seal 104," a static pressure type non-contact gas seal shown in FIG. 5 is referred to as "fifth gas seal 105," a static pressure type non-contact gas seal shown in FIG. 6 is referred to as "sixth gas seal 106," pressure type non-contact gas seal shown in FIG. 7 is referred to as "seventh gas seal 107," a static pressure type non-contact gas seal shown in FIG. 8 is referred to as "eighth gas seal 108," a static pressure type non-contact gas seal shown in FIG. 9 is referred to as "ninth gas seal 109," a static pressure type non-contact gas seal shown in FIG. 10 is referred to as "tenth gas seal 110," a static pressure type non-contact gas seal shown in FIG. 11 is referred to as "eleventh gas seal 111," a static pressure type non-contact gas seal shown in FIG. 12 is referred to as "twelfth gas seal 112," and a static pressure type non-contact gas seal shown in FIG. 18 is referred to as "thirteenth gas seal 113." Further, FIG. 13 is an enlarged longitudinal sectional side view of main parts of the first gas seal 101, FIG. 14 is a front view showing a stationary sealing ring of the first seal 101, FIG. 15 is an enlarged longitudinal sectional side view of main parts of the third gas seal 103, FIG. 16 is an enlarged longitudinal sectional side view of main parts of the twelfth gas seal 112, and FIG. 17 is a front view showing a rotary sealing ring of the twelfth gas seal 112. In the following description, for the sake of convenience, front and rear mean right and left in FIGS. 1 to 12 and top and bottom mean top and bottom in FIG. 18.

The first gas seal 101, as shown in FIG. 1, includes a rotary sealing ring 3 fixed to a rotary shaft 2 serving as a rotary member, a stationary sealing ring 4 held in a seal case 1 so as to be axially movable (movable back and forth) in a state in which it faces the rotary sealing ring 3, an opening force generating means 7 that supplies seal gas 6 to the space between sealing end surfaces 3a and 4a as facing end surfaces of both the sealing rings 3 and 4, from a joined seal gas passage 5 passing through the seal case 1 and the stationary sealing ring 4, to thereby generate an opening force acting on the stationary sealing ring 4 in a direction in which the space between the sealing end surfaces 3a and 4a is opened, and a closing force generating means 8 that generates a closing force acting on the stationary sealing ring 4 in a direction in which the space between the sealing end surfaces 3a and 4a is closed. The first gas seal is also adapted to shield and seal a sealed fluid region H serving as an outer peripheral region of the sealing end surfaces 3a and 4a and a non-sealed fluid region L serving as an inner peripheral region of the sealing end surfaces while keeping the sealing end surfaces 3a and 4a in a mutual non-contact state. In addition, in this example, the sealed fluid region H is a high-pressure gas region that communicates with the interior of a rotary apparatus equipped with the first gas seal 101, and the non-sealed fluid region L is an atmospheric region that communicates with the outside of the rotary apparatus.

The seal case 1, as shown in FIG. 1, is in the form of a cylinder that concentrically surrounds the rotary shaft 2 protruding horizontally from a housing 9 of the rotary apparatus and is attached to a rear end of the housing 9.

The rotary sealing ring 1, as shown in FIG. 1, is fixed to the rotary shaft 2 via cylindrical fixing members 10 and 11. The rotary sealing ring 3 is an annular body whose rear end surface is formed in the sealing end surface 3a (hereinafter referred to as "rotary-side sealing end surface") as a smooth surface orthogonal to the axis.

The stationary sealing ring 4, as shown in FIG. 1, is held via first and second O-rings 12 and 13 at an inner periphery of the seal case 1 so as to be movable axially in a state in which it concentrically faces the rotary sealing ring 3. The stationary sealing ring 4, as shown in FIG. 13, is an annular body composed of first, second, third, and fourth annular portions 14, 15, 16 and 17 whose outer diameters are different from one another. A front end surface of the first annular portion 14 is formed in the sealing end surface (hereinafter referred to as "stationary-side sealing end surface") 4a as a smooth surface orthogonal to the axis. An outer diameter D1 (the outer diameter of the rotary-side sealing end surface 4a) of the foremost first annular portion 14, an outer diameter D2 of the second annular portion 15 connected to the rear of the first annular portion, an outer diameter D3 of the third annular portion 16 connected to the rear of the second annular portion, an outer diameter D4 of the fourth annular portion 17 connected to the rear of the third annular portion are set to be $D1 \leq D2$ and $D4<D2<D3$. Further, the outer diameter D1 of the stationary-side sealing end surface 4a is set to be smaller than the outer diameter of the rotary-side sealing end surface 3a, and the inner diameter of the stationary-side sealing end surface 4a is set to be larger than the inner diameter of the rotary-side sealing end surface 3a. In addition, the stationary sealing ring 4 is prevented from rotating relative to the seal case 1 by an engaging action of a driving pin 26 planted in the seal case 1 in a state in which the stationary sealing ring is allowed to move axially within a predetermined range.

The first and second O-rings 12 and 13, as shown in FIG. 12, are interposed in a properly compressed state between the facing peripheral surfaces of the stationary sealing ring 4 and seal case 1, to secondarily seal the space between the stationary sealing ring 4 and the seal case 1 while allowing backward and forward movement of the stationary sealing ring 4 within a predetermined range. That is, the first O-ring 12 is loaded between the outer peripheral surface of the second annular portion 15 and the inner peripheral surface of the seal case 1, and its forward movement is prevented by a first annular locking surface 1a formed at the inner periphery of the seal case 1 within a range in which it does not deviate from the outer peripheral surface of the second annular portion 15. Further, the second O-ring 13 is loaded between the outer peripheral surface of the fourth annular portion 17 and the inner peripheral surface of the seal case 1, and its rearward movement is prevented by a second annular locking surface 1b formed at the inner periphery of the seal case 1 within a range in which it does not deviate from the outer peripheral surface of the fourth annular portion 17. Thereby, an annular communication space 18 blocked by the first and second O-rings 12 and 13 is formed between the facing peripheral surfaces of the stationary sealing ring 4 and the seal case 1.

The opening force generating means 7, as shown in FIG. 1, is composed of the joined seal gas passage 5 passing through the seal case 1 and the stationary sealing ring 4, and a seal gas supply device 20 that supplies the seal gas 6, which has a predetermined pressure P1 (>P) higher than the pressure P of the sealed fluid region H (hereinafter referred to as "sealed fluid pressure"), to the seal gas passage 5 from a seal gas supply passage 19.

As shown in FIG. 12, the seal gas passage 5, which is an annular space formed between the facing peripheral surfaces of the seal case 1 and the stationary sealing ring 4, is composed of the communication space 18 blocked up by the two O-rings 12 and 13 mounted between the facing peripheral surfaces, a case-side passage 21 that passes through the seal case 1 and has its upstream end connected to the seal gas supply passage 19 and its downstream end opened to the communication space 18, a static pressure generating groove 22 that is formed in the stationary-side sealing end surface 4a, a sealing ring-side passage 23 that passes through the stationary sealing ring 4 and has its upstream end opened to the communication space 18 and its downstream end opened to the static pressure generating groove 22, and a throttle 24 that is disposed in a proper place of the sealing ring-side passage 23.

The static pressure generating groove 22 is continuous shallow recess or intermittent shallow recesses that define(s) an annular shape concentrically with the stationary-side sealing end surface 4a. In this example, the latter intermittent shallow recesses are employed. That is, the static pressure generating groove 22, as shown in FIG. 14, is composed of a plurality of juxtaposed circular-arc-shaped recesses 22a that define an annular shape concentrically with the stationary-side sealing end surface 4a.

The downstream end of the sealing ring-side passage 23 is branched into branch portions 23a. The branch portions, as shown in FIGS. 13 and 14, are opened to the circular-arc-shaped recesses 22a, respectively, which constitute the static pressure generating groove 22.

The throttle 24, which has a throttling function like orifices, capillary tubes, and porous members, is disposed in a proper place of the sealing ring-side passage 23 excluding the branch portions 23a. In addition, the throttle 24 can be disposed in a proper place of the seal gas passage 5. In this case, as described below, when the communication space 18 and a back pressure chamber 25 are used together, the throttle is disposed in the sealing ring-side passage 23 downstream of the communication space 18 in the seal gas passage 5.

The seal gas supply device 20 supplies the seal gas having a higher pressure P1 than the seal fluid pressure P to the static pressure generating pressure groove 22 via the case-side passage 21, the communication space 18, the sealing ring-side passage 23, and the throttle 24 from the seal gas supply tube 19 connected to an upstream end of the case-side passage 21. As the sea gas 6, seal gases of properties that are harmless and have no bad effect on the sealed fluid (the fluid within the sealed region H) even if the gases leaks to the respective regions H and L are appropriately selected according to sealing conditions. In this example, a clean nitrogen gas that is inert to various substances and harmless to human bodies is used. In addition, normally, the seal gas 6 is supplied during operation of a rotary apparatus (during driving of the rotary shaft 2) and is stopped after shutdown. The operation of the rotary apparatus is started after supply of the seal gas 6 is started and then the sealing ends surfaces 3a and 4a are kept in a proper mutual non-contact state. The supply or stop of the seal gas 6 is performed after the operation of the rotary apparatus is stopped and then the rotary shaft 2 is completely stopped. Further, although the pressure P1 of the seal gas 6 is set according to on sealing conditions, it is generally set or controlled to be about 0.5 to 1.5 bars higher than the sealed fluid pressure P.

Accordingly, according to the opening force generating means 7, supplying the seal gas 6 to the space between the sealing end surfaces 3a and 4a from the seal gas passage 5 causes an opening force to be generated in the stationary sealing ring 4 in a direction in which the stationary sealing ring is separated from the rotary sealing ring 3, that is, the space between the sealing end surfaces 3a and 4a is opened.

The closing force generating means 8, as shown in FIG. 1, is configured such that a back pressure chamber 25 blocked by the two O-rings 12 and 13 is formed between the facing peripheral surfaces of the seal case 1 and the stationary sealing ring 4, and a portion of the seal gas 6 to be supplied to the seal gas passage 5 or a portion of the seal gas 6 flowing through the seal gas passage 5 is introduced into the back pressure chamber 25 to cause a back pressure generated by the seal gas passage 5 to act on the stationary sealing ring 4, thereby generating the closing force. In this case, the closing force generating means has no spring for generating the closing force unlike a conventional gas seal.

In this example, as shown in FIG. 13, the communication space 18 that is a component of the seal gas passage 5 is also used as the back pressure chamber 25. If the back pressure chamber 25 is supplied with the seal gas 6, the back pressure chamber assumes such a shape that a closing force is caused to act on the stationary sealing ring 4 in a direction in which the stationary sealing ring is pressed against the rotary sealing ring 4, that is, the sealing end surfaces 3a and 4a are closed (in consideration of the influence of the sealed fluid pressure P if D1<D2). Specifically, as shown in FIG. 13, a backward thrust force (first thrust force) F1 resulting from the sealed fluid pressure P acting on a front end surface 4b of the second annular portion 15, a backward thrust force (second thrust force) F2 resulting from the seal gas pressure P1 acting on a front end surface 4c of the third annular portion 16, and a forward thrust force (third thrust force) F3 resulting from the seal gas pressure P1 acting on a rear end surface 4d of the third annular portion 16 act on the stationary sealing ring 4 (if D1=D2, the first thrust force is not generated). Here, $F1=(\pi/4)((D2)^2-(D1)^2)(P)$, $F2=(\pi/4)((D3)^2-(D2)^2)(P1)$, and $F3=(\pi/4)((D3)^2-(D4)^2)(P1)$. Accordingly, by setting the outer diameters D1, D2, D3 and D4 of the respective annular portions 14, 15, 16 and 17 so as to be F3−(F1+F2)>0, a closing force (=F3−(F1+F2)) is generated by the seal gas 6 supplied to the back pressure chamber 25. Also, the magnitude of the closing force is determined according to the size of the outer diameters D1, D2, D3 and D4 (the magnitude of the pressures P and P1) of the respective annular portions 14, 15, 16 and 17. By appropriately setting the size of the outer diameters, the closing force is balanced with the opening force resulting from the seal gas 6 supplied to the space between the sealing end surfaces 3a and 4a. In other words, the closing force is set such that a proper clearance (generally, 5 to 15 μm) is maintained between the sealing end surfaces 3a and 4a by virtue of the balance of the closing force and the opening force.

In the first gas seal 101 configured as above, when the seal gas 6 is supplied to the static pressure generating groove 22 from the case-side passage 21, the communication space 18 and the sealing ring-side passage 23, the seal gas 6 introduced into the static pressure generating groove 22 generates an opening force acting on the space between the sealing end surfaces 3a and 4a in a direction in which the sealing end surfaces are opened. The opening force is a force resulting from the static pressure that is generated by the seal gas 6 introduced between the sealing end surfaces 3a and 4a. Further, the seal gas 6 introduced into the back pressure chamber 25 that is also used as the communication space 18 causes a closing force balanced with the magnitude of the opening force to act on the stationary sealing ring 4 in a direction in which the sealing end surfaces 3a and 4a are closed. Accordingly, the sealing end surfaces 3a and 4a are kept in a non-contact state in which a proper clearance is maintained by the balance of the opening force and the closing force. That is, the seal gas 6 introduced into the static pressure generating groove 22 forms a static fluid film which maintains the balance with the closing force between the sealing end surfaces 3a and 4a. The existence of the fluid film causes the space between the outer-diameter-side or inner-diameter-side regions H and L of the sealing end surfaces 3a and 4a to be shielded and sealed.

Meanwhile, when supply of the seal gas 6 is started, since introduction of the seal gas 6 to the space between the sealing end surfaces 3a and 4a is performed by way of the throttle 24, a closing force resulting from the seal gas 6 supplied to the back pressure chamber 25 without passing through the throttle 24 is generated ahead of generation of an opening force. Accordingly, irrespective of the fact that a spring is not used as the closing force generating force 8, similar to a conventional gas seal using a spring, the sealing end surfaces 3a and 4a are kept in a mutual non-contact state with a proper clearance therebetween by the balance of the opening force and the closing force. Further, since the seal gas 6 is introduced into the static pressure generating groove 22 after it is throttled by the throttle 24, even if the clearance between sealing end surfaces 3a and 4a is changed, the clearance is automatically adjusted and maintained properly. Specifically, when the clearance between the sealing end surfaces 3a and 4a becomes larger than a proper clearance due to vibration, etc. of a rotary apparatus, the amount of the seal gas flowing out between the sealing end surfaces 3a and 4a from the static pressure generating groove 22 and the amount of the seal gas supplied to the static pressure generating groove 22 through the throttle 24 becomes unbalanced. As a result, the pressure within the static pressure generating groove 22 is lowered, which makes the opening force smaller than the closing force. Therefore, the clearance between the sealing end surfaces 3a and 4a is changed so as to become smaller, whereby the clearance is adjusted to a proper one. On the contrary, when the clearance between the sealing end surfaces 3a and 4a becomes smaller than a proper clearance, the pressure within the static pressure generating groove 22 rises due to the throttling function of the throttle 24 similar to the above, which makes the opening force larger than the closing force. As a result, the clearance between the sealing end surfaces 3a and 4a is changed so as to become larger, whereby the clearance is adjusted to a proper one.

In this way, if the supply of the seal gas 6 is properly performed, the first gas seal 101 can seal the sealed fluid region H well while keeping the sealing end surfaces 3a and 4a in a mutual non-contact state, similar to a conventional gas seal using a spring as the opening force generating force.

Thus, if troubles are caused in a seal gas supply system due to failure, erroneous operation or the like of the seal gas supply device 20, etc. during operation (or at a stage during which the operation is completely stopped), and thereby supply of the seal gas 6 stops unexpectedly, the earlier-mentioned problems do not occur in the first gas seal 101, unlike the conventional gas seal.

Specifically, when supply of the seal gas 6 stops, the introduction of the seal gas to the space between the sealing end surfaces 3a and 4a stops and thereby the opening force vanishes. Simultaneously with this, the introduction of the seal gas 6 into the back pressure chamber 25 also stops, and thereby the closing force vanishes. Accordingly, when the seal gas 6 stops unexpectedly, since the opening force and the closing force vanish simultaneously, the sealing end surfaces 3a and 4a are kept in a non-contact with each other without shifting of the supply of the seal gas 5 from its stopped state. As a result, there is no possibility that the sealing end surfaces 3a and 4a collide severely against each other and consequently they are damaged or destructed, as earlier mentioned, due to unexpected stop of the supply of the seal gas 6.

Further, when supply of the seal gas 6 is resumed from the above state, the opening and closing forces resulting from the seal gas 6 are generated again and thereby the sealing end surfaces 3a and 4a are kept in a proper mutual non-contact state. At this time, if the opening force and the closing force are simultaneously generated again, there is a possibility that the sealing end surfaces 3a and 4a cannot be restored to their proper non-contact state due to excessive opening therebetween by the opening force. However, since the introduction of the seal gas 6 to the space between the sealing end surfaces 3a and 4a is performed by way of the throttle 24, the closing force resulting from the seal gas 6 supplied to the back pressure chamber 25 is generated ahead of the generation of the opening force without passing through the throttle 24. As a result, the sealing end surfaces 3a and 4a are restored to and kept in a mutual non-contact state with a proper clearance therebetween without occurrence of the above-mentioned possibility. In addition, if expression D1=D2 is not satisfied (D1<D2), the first thrust force F1 on the static pressure sealing ring 4. Therefore, when the supply of the seal gas 6 has stopped (or when the supply is resumed while the pressure of the sealed fluid remains), sudden movement of the stationary sealing ring 4 toward the rotary sealing ring by the thrust force $F_1$ is more positively prevented. Consequently, there is no possibility that the sealing end surfaces 3a and 4a may collide severely against each other.

Further, the second gas seal 102, as shown in FIG. 2, has the same structure as the first gas seal 101 and exhibits the same functions as the first gas seal 101 in that it has a double-tube structure having an outer-diameter tubular portion 1c and an inner-diameter tubular portion 1d, the stationary sealing ring 4 is shaped such that the outer diameter of the fourth annular portion 17 coincides with the outer diameter of the third annular portion 16, and the second O-ring 13 is disposed between the inner peripheral surface of the fourth annular portion 17 and the outer peripheral surface of the inner-diameter tubular portion 1d. Since an entire back surface 4e (rear end surface of the fourth annular portion 17) of the stationary sealing ring 4 can be a pressure-receiving surface for generating the third thrust force F3, a sufficient closing force can be ensured in the second gas seal 102, even if a closing force required for maintaining the balance with an opening force cannot be ensured in the first gas seal 101 from the viewpoint of the shape of the stationary sealing ring 4. In this way, the shape of the back pressure chamber 25 that is also used as the communication space 18 can be appropriately changed by contriving the arrangement, etc. of the second O-ring 13. In addition, the closing force in the second gas seal 102 is obtained by subtracting a first thrust force F1 resulting from the sealed fluid pressure P acting on the front end surface 4b of the second annular portion 15, a second thrust force F2 resulting from the seal gas pressure P1 acting on the front end surface 4c of the third annular portion 16, from a third thrust force F3 resulting from the seal gas pressure P1 acting on the rear end surface 4e of the fourth annular portion 17. Here, if the outer diameters of the first and second annular portions 14 and 15 coincide with each other, a first thrust force F1 is not generated.

Further, although the first and second gas seals 101 and 102 are configured such that the back pressure chamber 25 is also used as the communication space 18, they can be configured such that the back pressure chamber 25 is not used as the communication space 18 and vice-versa, like the third gas seal 103.

The third gas seal 103, as shown in FIGS. 3 and 5, is configured such that first, second and third O-rings 12, 13 and 28 are disposed between the facing peripheral surfaces of the seal case 1 and the stationary sealing ring 4, to thereby partition the communication space 18 blocked by the first and second O-rings 12 and the 13 and the back-pressure chamber 25 blocked by the second and third O-rings 13 and 28 between the peripheral surfaces, and a portion of the seal gas 6 to be supplied to the seal gas passage 5 from the seal gas supply passage 19 is introduced into the back pressure chamber 25. Except for this point and the point that the seal case 1 has a double-tube structure similar to the second gas seal 102, the third gas seal has the same structure as the first gas seal 101.

Specifically, the stationary sealing ring 4 is shaped such that the outer diameter of the fourth annular portion 17 coincides with the outer diameter of the second annular portion 15, the first and second O-rings 12 and 13 are loaded between the outer peripheral surfaces of the second and fourth annular portions 15 and 17 and the inner peripheral surface of the outer-diameter tubular portion 1c of the seal case 1, and the third O-ring 28 is loaded between the inner peripheral surface of the fourth annular portion 17 and the outer peripheral surface of the inner-diameter tubular portion 1d of the seal case 1, whereby the communication space 18 and the back pressure chamber 25 are formed as individual independent annular spaces partitioned by the second O-ring 13. Also, in the closing force generating means 8, a closing-force-generating gas passage 5a communicating with the back pressure chamber 25 is formed in the seal case 1 independently from the seal gas passage 5, and a closing-force-generating gas supply passage 19a branched from the seal gas supply passage 19 is connected to the closing-force-generating gas passage 5a, whereby a portion of the seal gas 6 to be supplied to the seal gas passage 5 from the seal gas supply passage 19 is introduced into the back pressure chamber 25 via the closing-force-generating supply passage 19a and the closing-force-generating gas passage 5a. As a result, similar to the first and second gas seals 101 and 102, a closing force balanced with an opening force is generated. The closing force in the third gas seal 103 is obtained by subtracting a first thrust force F1 resulting from the seal fluid pressure P acting on the front end surface 4b of the second annular portion 15 from a third thrust force F3 resulting from the seal gas pressure P acting on the rear end surface 4e of the fourth annular portion 17. Here, any thrust force is not generated by the seal gas 6 introduced into the communication space 18. If the outer diameters of the first and second annular portions 14 and 15 coincide with each other, a first thrust force F1 is not generated.

Meanwhile, when supply of the seal gas 6 stops, the back pressure (closing force) resulting from the seal gas pressure P1 acting on the back pressure chamber 25 vanishes. Therefore, the stationary sealing ring 4 does not move toward the rotary sealing ring and thus it does not collide severely against the rotary sealing ring 6. However, there is a case that it is preferable to provide a means for positively avoiding sudden movement of the stationary sealing ring 4 toward the rotary sealing ring, when supply of the seal gas 6 stops unexpectedly according to seal conditions. The fourth, fifth, sixth, seventh, eighth, and ninth gas seals 104, 105, 106, 107, 108, and 109, respectively, show examples of such a case.

The fourth or fifth gas seal 104 or 105, as shown in FIG. 4 or 5, is configured such that a pressure keeping chamber 30 that allows the seal gas 6 to be introduced thereinto to generate a resistance force that prevents the stationary sealing ring 4 from moving toward the rotary sealing ring is formed between the facing peripheral surfaces of the seal case 1 and the stationary sealing ring 4, and a seal gas introducing passage 32 that communicates the pressure keeping chamber 30 with the back pressure chamber 25 or the communication space 18 and has a throttle 31 disposed therein is formed in the stationary sealing ring 4, thereby positively preventing sudden movement of the stationary sealing ring 4 toward the rotary sealing ring when supply of the seal gas 6 stops unexpectedly.

Specifically, the fourth gas seal 104, as shown in FIG. 4, has the same structure as the second gas seal 102 except that a fourth O-ring 33 is loaded to a first O-ring loaded position in the second gas seal 102, and the first O-ring 12 is loaded between the third annular portion 16 and the outer-diameter tubular portion 1c of the seal case 1, thereby forming the pressure keeping chamber 30 as an annular space sealed by the first and fourth O-rings 12 and 33 between the stationary sealing ring 4 and the seal case 1, and the seal gas introducing passage 32 that communicates the pressure keeping chamber 30 and the back pressure chamber 25, which is also used as the communication space 18, with each other, and has the throttle 31 disposed therein is formed in the stationary sealing ring 4. In addition, the throttle 32 has a throttling function like orifices, capillary tubes, and porous members, similar to the throttle 24 disposed in the seal gas passage 24.

In the fourth gas seal 104, the seal gas 6 is introduced into the pressure keeping chamber 30 via the seal gas introducing passage 32 from the back pressure chamber 25 that is also used as the communication space 18, and the seal gas 6 introduced into the pressure keeping chamber 30 generates a thrust force in a direction in which the stationary sealing ring 4 is separated from the rotary sealing ring 3. This thrust force results from the seal gas pressure P1 acting on the front end surface 4c of the third annular portion 15, and it is functionally the same as the second thrust force F2 in a state of the seal gas 3 being supplied.

Thus, when supply of the seal gas 6 is stopped unexpectedly, simultaneously with this, an opening force acting on the space between the sealing end surfaces 3a and 4a and a closing force resulting from the seal gas 6 acting on the back pressure chamber 25 will vanish. In this case, the seal gas 6 within the pressure keeping chamber 30 is smoothly drained by the throttle 31 provided in the seal gas introducing passage 32, and consequently it remains for a while even after stop of the supply of the seal gas 6. Accordingly, even when supply of the seal gas 6 has stopped, the seal gas pressure P1 remaining within the pressure keeping chamber 30 generates a resistance force that prevents the stationary sealing ring 4 from moving toward the rotary sealing ring. This resistance force prevents sudden movement of the stationary sealing ring 4 toward the rotary sealing ring when supply of the seal gas 6 stops. That is, in a moment when supply of the seal gas 6 has stopped, there is no case that the stationary sealing ring 4 moves suddenly and collides severely against the rotary sealing ring 3.

Further, in the fifth gas seal 105, as shown in FIG. 5, the communication space 18 blocked by the first and second O-rings 12 and 13 is formed between the outer peripheral surfaces of the third and fourth annular portions 16 and 17 and the inner peripheral surface of the outer-diameter tubular portion 1c of the seal case 1, and the back pressure chamber 25 blocked by the second and third O-rings 12 and 28 is formed between the inner peripheral surface of the fourth annular portion 16 and the outer peripheral surface of the inner-diameter tubular portion 1c of the seal case 1, whereby the closing force generating means 8 is configured similarly to the third gas seal 103 and the pressure keeping chamber 30 is communicated with the communication space 18 by the seal gas introducing passage 32 having the throttle 31. In such a structure, similar to the fourth gas seal 104, when supply of the seal gas 6 has stopped, the seal gas pressure P1 remaining within the pressure keeping chamber 30 generates a resistance force that prevent the stationary sealing ring 4 from moving toward the rotary sealing ring, and this resistance force prevents sudden movement of the stationary sealing ring 4 toward the rotary sealing ring when supply of the seal gas stops. In addition, in the fifth gas seal 105, although not shown, the pressure keeping chamber 30 may be adapted to communicate with the back pressure chamber 25 via the throttle 31 and the seal gas introducing passage 32.

Further, the sixth, seventh, eighth, and ninth gas seals 106, 107, 108 and, 109 are configured such that an elastic member 34 or 35 that biases the stationary sealing ring 4 away from the rotary sealing ring 4 is interposed between the seal case 1 and the stationary sealing ring 4, thereby preventing sudden movement of the stationary sealing ring 4 toward the rotary sealing ring when supply of the seal gas 6 stops.

Specifically, the sixth or seventh gas seal 106 or 107, as shown in FIG. 6 or 7, is configured such that a spring 34 as the elastic member that biases the stationary sealing ring 4 away from the rotary sealing ring 3 is disposed between the seal case 1 and the stationary sealing ring 4, whereby even when supply of the seal gas 6 is stopped unexpectedly, a biasing force generated by the spring 34 prevents sudden movement of the stationary sealing ring 4 toward the rotary sealing ring. In addition, the biasing force generated by the spring 34 is set to a sufficiently high value required to prevent the sudden movement of the stationary sealing ring 4 when an opening force generated by the opening force generating means 7 and a closing force generated by the closing force generating means 8 have vanished. It is thus needless to say that the balance of the opening and closing forces for keeping the sealing end surfaces 3a and 4a in a proper mutual non-contact state will not be upset.

Further, the eighth or ninth gas seal 108 or 109, as shown in FIG. 8 or 9, is configured such that an O-ring 35 as the elastic member that biases the stationary sealing ring 4 away from the rotary sealing ring 3 is disposed between the seal case 1 (the inner-diameter tubular portion is denoted in the eighth gas seal 108 by reference numeral 1d, and the outer-diameter tubular portion is denoted in the ninth gas seal 109 by reference numeral 1c) and the stationary sealing ring 4, whereby when supply of the seal gas 6 is stopped unexpectedly, a biasing force generated by (elastic deformation in a shaft-line) the O-ring 35 prevents sudden movement of the stationary sealing ring 4 toward the rotary sealing ring. In addition, in the ninth gas seal 109, the O-ring 35 is also used as the first O-ring 12 for sealing the back pressure chamber 25 that is also used as the communication space 18. Further, the biasing force generated by the O-ring 35 is set to a sufficiently high value required to prevent the sudden movement of the stationary sealing ring 4 when an opening force generated by the opening force generating means 7 and a closing force generated by the closing force generating means 8 have vanished. It is thus needless to say that the balance of the opening and closing forces for keeping the sealing end surfaces 3a and 4a in a proper mutual non-contact state will not be upset.

Meanwhile, when the first thrust force F1 acts under the conditions in which the sealed fluid pressure P fluctuates, there is also a case that a sufficient closing force required to maintain the balance with the closing force cannot be ensured by the seal gas pressure P1 acting on the back pressure chamber 25. In this case, a closing force resulting from the sealed fluid pressure P may be added like the tenth gas seal 110.

Specifically, the tenth gas seal 110, as shown in FIG. 10, is configured such that an auxiliary back pressure chamber 37 blocked by two O-rings 28 and 36 and partitioned by the back pressure chamber 25 is formed between the peripheral surface of the inner-diameter tubular portion 1*d* of the seal case 1 and the peripheral surface of the stationary sealing ring 4, and a through hole 38 that communicates the sealed fluid region H with the auxiliary back pressure chamber 37 is formed in the stationary sealing ring 4, whereby the sealed fluid pressure P introduced into the auxiliary back pressure chamber 37 from the through hole 38 generates a closing force that presses the stationary sealing ring 4 toward the rotary sealing ring 3. In addition, the tenth gas seal 110 has the same structure as the third gas seal 103 except that the auxiliary back pressure chamber 37 and the through hole 38 are provided.

In the tenth gas seal 110, a closing force is added by the sealed fluid pressure P introduced into the auxiliary back pressure chamber 37, and the closing force changes in response to a fluctuation in the pressure of the sealed fluid region H. Therefore, excellent sealing function is exhibited even under the conditions in which the pressure P of the sealed fluid fluctuates.

In addition, as in the tenth gas seal 110, in a gas seal configured such that the auxiliary back pressure chamber 37 is provided so as to add a closing force resulting from the sealed fluid pressure P, there is a possibility that, when supply of the seal gas 6 stops and thus a closing force vanishes, the closing force suddenly moves the stationary sealing ring 4 toward the rotary sealing ring. This possibility can be ruled out by contriving an arrangement in which a thrust force (first thrust force F1) resulting from the sealed fluid pressure P acting on the front end surface 4*b* of the second annular portion 15 is balanced with the closing force. Further, when it is difficult to perform such contrivance from the viewpoint of sealing conditions, such as the shape of the stationary sealing ring 4, the above possibility can be effectively ruled out by providing the pressure keeping chamber 30 as in the fourth or fifth gas seal 104 or 105, or by providing the elastic member 34 or 35 as in the sixth, seventh, eighth, or ninth gas seal 106, 107, 108 or 109. The eleventh gas seal 111 is an example of such a case.

Specifically, the eleventh gas seal 111, as shown in FIG. 11, has the same structure as the tenth gas seal 110 except that the spring 34 that biases the stationary sealing ring 4 away from the rotary sealing ring 3 is provided between the seal case 1 and the stationary sealing ring 4, similarly to the sixth gas seal 106.

In the eleventh gas seal 111, when supply of the seal gas 6 is stopped unexpectedly, even if a closing force generated by the auxiliary back pressure chamber 37 exists, a biasing force generated by the spring 34 prevents sudden movement of the stationary sealing ring 4 toward the rotary sealing ring, and thus the sealing end surfaces 3*a* and 4*a* do not collide severely against with each other.

Further, in each of the above-described gas seals 101, 102, 103, 104, 105, 106, 107, 108, 109, 110, and 111, the opening force generating force 7 is configured such that only static pressure is generated between the sealing end surfaces 3*a* and 4*a*. However, the opening force generating force can also be configured such that, in addition to the static pressure, dynamic pressure is generated between the sealing ring surfaces 3*a* and 4*a*. The twelfth gas seal 112 is an example of a complex non-contact gas seal that is configured such that the opening force is generated by such static and dynamic pressures.

Specifically, the twelfth gas seal 112, as shown in FIG. 12, is configured such that a dynamic pressure generating groove 41 is formed in the rotary-side sealing end surface 3*a* so that the dynamic pressure generating groove 41 generates a closing force resulting from dynamic pressure between the sealing end surfaces 3*a* and 4*a*. The twelfth gas seal has the same structure as the first gas seal 101 except for this point.

The shape of the dynamic pressure generating groove 41 can be appropriately set according to sealing conditions. In this example, the dynamic pressure generating groove 41, as shown in FIG. 17, is formed in such a shape that a plurality of grooves 42 composed of first groove portions 42*a* extending in a radial outward direction from the portion of the rotary-side sealing end surface 3*a* facing the static pressure generating groove 22 obliquely in a direction (R direction) reverse to the direction of rotation of the rotary sealing ring 3 and second groove portions 42*b* extending in a radial inward direction obliquely in the direction (R direction) reverse to the direction of rotation of the rotary sealing ring 3 are juxtaposed in the peripheral direction of the sealing end surfaces 3*a*. Each groove 42 is a groove having a constant shallow depth of 1 to 10 μm. An outermost-diameter-side end of the groove (an outer-diameter-side end of each of the first groove portions 42*a*) and an innermost-diameter-side end of the groove (an inner-diameter-side end of each of the second groove portions 42*b*) are located in an overlapping region of both the sealing end surfaces 3*a* and 4*a*. Specifically, as shown in FIG. 16, the inner diameter "e" and the outer diameter "f" of the dynamic pressure generating groove 41 are appropriately set with respect to the outer diameter "a" ($\leq$ the outer diameter of the rotary-side sealing end surface 3*a*) of the stationary sealing end surface 4*a* and the inner diameter "d" ($\geq$ the inner diameter of the rotary-side sealing end surface 3*a*) thereof and the outer diameter "b" of the static pressure generating groove 22 (circular-arc-shaped recess 22*a*) and the inner diameter "c" thereof within a range in which the following relationship is satisfied: b<f<a, and d<e<c. In this example, the inner diameter and the outer diameter of the dynamic pressure generating groove are set so as to satisfy the following condition: $0.5 \leq (f-b)/(a-b) \leq 0.9$, or $0.5 \leq (c-e)(c-d) \leq 0.9$. Each groove 42 is formed in a V-shape that a first groove portion 42*a* coincides with a second groove portion 42*b*, as shown in FIG. 17A, or it is formed in an alternate shape that base ends of a first groove portion 42*a* and a second groove portion 42*b* are offset in the peripheral direction, as shown in FIG. 17B.

According to the twelfth gas seal 112 that is the complex non-contact gas seal as described above, a dynamic pressure generated by the dynamic pressure generating groove 41 in addition to a static pressure generated by the seal gas 6 is generated between the sealing end surfaces 3*a* and 4*a*, and these static and dynamic pressures generate an opening force for keeping the sealing end surfaces 3*a* and 4*a* in a mutual non-contact state. Accordingly, even if the sealing end surfaces 3*a* and 4*a* cannot be kept in a proper mutual non-contact state by the static pressure generated by the seal gas 6, they can be kept in a proper mutual non-contact state by the dynamic pressure. Further, as compared with the static pressure type non-contact gas seal in which the sealing end surfaces are kept in a mutual non-contact state only by the static pressure, the required supply amount of the seal gas 6 can be reduced by the static pressure generated by the seal gas 6.

Further, since the dynamic pressure generating groove 41 is not opened outside the overlapping region of the sealing end surfaces 3a and 4a, the innermost-diameter-side end and outermost-diameter-side end of each groove 42 functions as a dam for the seal gas 6 introduced into the space between the sealing end surfaces 3a and 4a and operates to narrow the leakage clearance formed between the sealing end surfaces 3a and 4a. Accordingly, the amount of leakage of the seal gas 6 introduced into the space between sealing end surfaces 3a and 4a, to the sealed fluid region H is suppressed, which remarkably improves the capturing characteristics of the seal gas 6 generated by the dynamic pressure generating groove 41. Accordingly, the consumption of the seal gas 6 can be reduced. Even if any particles are entrained in the seal gas 6, the penetration thereof can be suppressed as much as possible. In addition, in a rotary apparatus in which the rotary shaft 2 is rotated in forward and reverse directions, the dynamic pressure generating groove 41 can be formed in such a shape to generate a dynamic pressure even if the rotary sealing groove 3 is rotated in forward and reverse directions. The shape of such a dynamic pressure generating groove 41 can be arbitrarily set according to sealing conditions or the like. Also, various shapes have conventionally been suggested. For example, a plurality of sets of dynamic pressure generating groove units, each composed of a first dynamic pressure generating groove and a second dynamic pressure generating groove, which are arranged in rows diametrically and forms a symmetrical shape with respect to a diametrical line, are formed in parallel at predetermined intervals. Thereby, when the rotary sealing ring 3 rotates in the forward direction, a dynamic pressure is generated by the first dynamic pressure generating groove, while when the rotary sealing ring 3 rotates in the reverse direction, a dynamic pressure is generated by the second dynamic pressure generating groove. Each of the first and second dynamic pressure generating grooves, for example, an L-shaped groove having constant groove depth and groove width can be employed.

Further, the static pressure type non-contact gas seals of the invention can also be preferably used as sealing devices of rotary apparatuses (for example, treatment apparatuses that perform a washing treatment and the like on substrates (semiconductor wafers, substrates of electronic devices, liquid crystal substrates, photo-masks, glass substrates, and the like) using a rotary table) that require a high level of contamination prevention measures, such as semiconductor-related apparatuses. The thirteenth gas seal 113, as shown in FIG. 18, is a sealing device for a treatment apparatus provided to shield the space between a treatment region H as the sealed fluid region where the rotary table 202 is disposed and a region L within a tubular plastic cover 204 as the non-sealed fluid region in a treatment apparatus in which a driving unit 203 of the rotary table 202 is covered with the tubular plastic cover 204.

In the treatment apparatus, as shown in FIG. 18, the driving unit 203 of the rotary table 202 is covered with the tubular plastic cover 204. When a proper treatment (a washing treatment, a chemical treatment, and the like) is performed on substrates such as semiconductor wafers, substrates of electronic devices, liquid crystal substrates, photo-masks and glass substrates by using the rotary table 202, the treatment region H where the rotary table 202 is disposed and the region L within the plastic cover 204 (the region within the cover) are shielded and sealed by the thirteenth gas seal 113 so as to keep the treatment region H clean.

In addition, the driving unit 203 includes a rotary shaft 203a connected to the rotary table 202 and extending up and down, a bearing that rotatably journals the rotary shaft 203a, a driving means of the rotary shaft 203a, and a support frame 203b that supports the driving means in the in-cover region L, and is adapted to rotationally drive the rotary table 202. The rotary table 202 is made of silicon carbide, and is in the form of a rotor, such as a disk, which is horizontally disposed in the treatment region H. Further, the plastic cover 204, as shown in FIG. 1, has a cylindrical shape having an open upper end, which is integrally formed from chemical-resistant plastic (PTFE is used in this example), and covers the driving unit 203 disposed on the underside of the rotary table 202. If necessary, as shown in FIG. 18, a proper labyrinth seal 205 can be provided between the rotary table 202 and the plastic cover 204. By providing such a labyrinth seal 205, with jetting of the chemicals into the treatment region H from the labyrinth region 205 of the gas seal 6, chemicals can be effectively prevented from penetrating into the region L in the cover from the treatment region H.

Thus, the thirteenth gas seal 113, as shown in FIG. 18, is adapted to include the cylindrical seal case 1 disposed within the plastic cover 204 and attached to the support frame 203b of the driving unit 203, the rotary sealing ring 3 fixed to the rotary table 202 serving as the rotary member, the stationary sealing ring 4 held so as to be movable axially (movable back and forth) in a state in which it concentrically faces the rotary sealing ring 3, the opening force generating means 7 that supplies the seal gas 6 to the space between the sealing end surfaces 3a and 4a as facing end surfaces of both the sealing rings 3 and 4, from the joined seal gas passage 5 passing through the seal case 1 and the stationary sealing ring 4, to thereby generate an opening force acting on the stationary sealing ring 4 in a direction in which the space between the sealing end surfaces 3a and 4a is opened, and the closing force generating means 8 that generates a closing force acting on the stationary sealing ring 4 in a direction in which the space between the sealing end surfaces 3a and 4a is closed, whereby the thirteenth gas seal shields and seals the treatment H as the outer peripheral region of the sealing end surfaces 3a and 4a and the in-cover region L as the inner peripheral region thereof while keeping the sealing end surfaces 3a and 4a in a mutual non-contact state. Therefore, the thirteen gas seal has the same structure as the first gas seal 101 except for the points as will be described below. In addition, the same constituent members as those of the first gas seal 101 are denoted by the same reference numerals, and thus the detailed description thereof will be omitted herein.

The seal case 1, as shown in FIG. 18, is a case made of metal (stainless steel such as US316) and composed of a cylindrical upper sealing ring holding part 61 and an annular attaching portion 63 overhanging inwardly from a lower end of a lower sealing ring holding portion 62. The lower sealing ring holding portion 62 and the attaching portion 63 are an integral structure, and these and the upper sealing ring holding portion 61 are separate structures and connected by an appropriate connector. The seal case 1 has its lower end (the lower end of the lower sealing ring holding portion 62) abutted against a cover stepped portion 204a, and the seal case is attached to the support frame 203b by means of the attaching portion 63 in a state in which its outer peripheral portion (an outer peripheral portion of the upper and lower sealing ring holding portion 61) is brought into close contact with to an upper-end-side inner peripheral portion (an inner peripheral portion above the cover stepped portion 204a) with an O-ring 206 made of fluorine rubber therebetween.

The rotary sealing ring 3 is an annular body made of a harder material (for example, carbon) than the constituent material of the stationary sealing ring 4, and as shown in FIG. 18, is fixed to a lower surface of the rotary table 202 concentrically with the rotary shaft 203a. A lower end surface of the rotary sealing ring 3 serves as the sealing end surface 3*a* (rotary-side sealing end surface) that is a smooth annular surface).

The stationary sealing 4, as shown in FIG. 18, is held in the inner peripheral portion of the seal case 1 so as to be axially movable (movable up and down) via the first and second O-rings 12 and 13 in a state in which it concentrically faces the rotary sealing ring 3. The stationary sealing ring 4, which has the same structure as that in the first gas seal 101, is an annular body composed of the first, second, third and fourth annular portions 14, 15, 16, and 17, which have different outer diameters. An upper end surface of the first annular portion 14 is formed on the sealing end surface (stationary-side sealing end surface) 4*a* formed as a smooth surface orthogonal to the axis. In addition, the stationary sealing ring 4 is prevented from rotating relative to the seal case 1 by an engaging action of the driving pin 26 planted in the attaching portion 63 of the seal case 1 in a state in which the stationary sealing ring is allowed to move axially within a predetermined range.

The first and second O-rings 12 and 13, as shown in FIG. 18, are interposed in a properly compressed state between the facing peripheral surfaces of the stationary sealing ring 4 and the upper and lower sealing ring holding portions 61 and 61 of the seal case 1, to secondarily seal the space between the stationary sealing ring 4 and the seal case 1 while allowing up-and-down movement (movement in the shaft-line direction) of the stationary sealing ring 4 within a predetermined range. The annular communication space 18 blocked by the first and second O-rings 12 and 13 is formed between the facing peripheral surfaces of the stationary sealing ring 4 and the seal case 1.

The opening force generating means 7, as shown in FIG. 18, is composed of the joined seal gas passage 5 passing through the seal case 1 and the stationary sealing ring 4, similarly to that of the first gas seal 101, and the seal gas supply device 20 that supplies the seal gas 6, which has a predetermined pressure P1 (>P) higher than the pressure P of the sealed fluid region H (sealed fluid pressure), to the seal gas passage 5 from the seal gas supply passage 19.

As shown in FIG. 18, the seal gas passage 5, which is an annular space formed between the facing peripheral surfaces of the seal case 1 and the stationary sealing ring 4, is composed of the communication space 18 blocked up by the two O-rings 12 and 13 mounted between the facing peripheral surfaces, the case-side passage 21 that passes through the seal case 1 and has its upstream end connected to the seal gas supply passage 19 and its downstream end opened to the communication space 18, the static pressure generating groove 22 that is formed in the stationary-side sealing end surface 4*a*, the sealing ring-side passage 23 that passes through the stationary sealing ring 4 and has its upstream end opened to the communication space 18 and its downstream end opened to the static pressure generating groove 22, and the throttle 24 that is disposed in a proper place of the sealing ring-side passage 23.

The case-side passage 21, as shown in FIG. 18, is composed of a first gas passage 21*a* axially passing through the lower sealing ring holding portion 62 and a second gas passage 21*b* passing through the upper sealing ring holding portion 61 toward an inner peripheral portion thereof from a lower end thereof. An upper end of the first gas passage 21*a* and a lower end of the second gas passage 21*b* are connected to and communicated with each other in a state they are sealed by an O-ring 21*c* made of fluorine rubber, which is mounted interposed between the upper and lower sealing ring holding portions 61 and 62. An upper end (downstream end) of the second gas passage 21*b* is communicated with the communication space 18.

The seal gas supply passage 19, as shown in FIG. 18, is composed of a first supply passage 19*a* formed in the plastic cover 204 and a second supply passage 19*b* that connects the first supply passage with the seal gas supply device 20. The first supply passage 19*a* passes vertically through (shaft-line direction of the plastic cover 204) and has its upper end (downstream end) opened to the cover stepped portion 204*a* and its lower end (upstream end) connected to the second supply passage 19*b*. The upper end of the first supply passage 19*a* and the lower end (upstream end) of the second gas passage 21*a* are connected to and communicated with each other in a state in which they are sealed by an O-ring 207 made of fluorine rubber, which is mounted between the cover stepped portion 204*a* and the lower sealing ring annular holding portion 62.

In addition, a coating layer made of chemical-resistant plastic, such as PFA and PTFE, is formed on the surface of the seal case 1 and the inner surface of the case-side passage 21.

Similarly to the first case seal 101, the closing force generating means 8, as shown in FIG. 18, is configured such that the back pressure chamber 25 blocked by the two O-rings 12 and 13 is formed between the facing peripheral surfaces of the seal case 1 and the stationary sealing ring 4, and a portion of the seal gas 6 to be supplied to the seal gas passage 5 or a portion of the seal gas 6 flowing through the seal gas passage 5 is introduced into the back pressure chamber 25 to cause a back pressure generated by the seal gas passage 5 to act on the stationary sealing ring 4, thereby generating the closing force.

According to the thirteenth gas seal 113 configured as above, the same sealing functions as those of the first gas seal 101 are exhibited, and the space between the treatment region H and the in-cover region L is completely shielded. Further, since both the sealing end surfaces 3*a* and 4*a* are kept in a mutual non-contact state by the seal gas 6, particles, such as frictional power, which may be caused by contact between the sealing end surfaces 3*a* and 4*a* are not generated. Accordingly, the treatment region H is kept clean without penetration of powder, etc. generated in the in-cover region L into the treatment region H. Conversely, there is no case that troubles are caused in a driving system, etc. of the rotary shaft 2*a* due to penetration of the treatment residue generated in the treatment region H into the in-cover region L. Specifically, since the seal gas 6 is jetted to the treatment region H and the in-cover region L from the space between the rotary sealing ring 3 on the side of the rotary table 202 and the stationary sealing ring 4 on the side of the plastic cover 204, the space between the treatment region H where the rotary table 202 is disposed and the in-cover region L where a driving means, etc. of the rotary shaft 203*a* is disposed can be positively shielded, the treatment in the treatment region H can be kept in a clean atmosphere in which penetration of particles from the in-cover region L (and generation of metal ions) is completely prevented, treatment such as washing of substrates can be performed well, and a high level of contamination prevention measures can be realized. Further, a problem can also be ruled out that washing liquid residue generated in the treatment region H or harmful substance used and generated in the treatment region H leaks to the in-cover region L and thus have a bad effect on a driving system of the rotary shaft 203*a*.

Meanwhile, the case-side passage 21 and the first supply passage 19*a*, as indicated by chain lines in FIG. 18, can be configured such that the downstream end the first supply passage 19*a* is opened to the inner peripheral surface of the plastic cover 204 and the case-side passage 21 is formed in the upper sealing ring holding portion 61 so as to pass axially therethrough, whereby both the passages 19a and 21 are connected to each other in a sealed state via an O-ring (not shown) loaded between the facing peripheral surfaces of the plastic cover 204 and upper sealing ring holding portion 61. If this configuration is employed, a pressure resulting from the high-pressure seal gas 6 acts on a communicating portion between both the passages 19a and 21. Therefore, the plastic cover 204 is deformed diametrically. As a result, there is a possibility that supply of the seal gas may be not performed well due to deterioration or loss of the sealing function of the O-ring. Accordingly, in this case, it is necessary to take a measure, such as making the cover 224 of a metal material that does not cause such deformation and performing coating on the surface of the cover. However, if both the passages 19a and 21, as shown in FIG. 18, is configured so that gas flow from the first supply passage 19a toward the case-side passage 21 is performed in the shaft-line direction of the plastic cover 204, the plastic cover 204 will be deformed irrespective of the material quality or thickness (diametrical thickness) of the plastic cover 204. Thus, the above-mentioned problem will not occur. Accordingly, the material quality and shape (thickness) of the plastic cover 20 can be freely set according to use conditions of a treatment apparatus without considering the strength against the gas pressure. Further, in a case in which the above-mentioned labyrinth seal 205 is provided between the gas seal 204 and the rotary table 202, the plastic cover 204 will also not be deformed. Therefore, the function of the labyrinth seal 205 will not be damaged.

In addition, the static pressure type non-contact gas seals of the invention are not limited to the configurations of the above-described first, second, third, fourth, fifth, sixth, seventh, eighth, ninth, tenth, eleventh, twelfth, and thirteenth gas seals 101, 102, 103, 104, 105, 106, 108, 107, 109, 110, 111, 112, and 113, appropriate improvements and modifications can be made thereto without departing from the basic principles of the invention. For example, in the treatment apparatus, such as a washing apparatus, having the rotary table 202, as shown in FIG. 18, static pressure type non-contact gas seals having the same structure as the above-described second, third, fourth, fifth, sixth, seventh, eighth, ninth, tenth, eleventh, and twelfth gas seals 102, 103, 104, 105, 106, 108, 107, 109, 110, 111, and 112 other than the thirteen gas seal 101 having the same structure as the first gas seal 101 can be used as the sealing device between both the regions H and L.

The invention claimed is:

1. A static pressure type non-contact gas seal including:
   a tubular seal case;
   a rotary sealing ring fixed to a rotary member;
   a stationary sealing ring held to be axially movable in the seal case with facing the rotary sealing ring;
   an opening force generating means for generating an opening force that acts on the stationary sealing ring in a direction to open the space between the facing end surfaces, serving as the sealing end surfaces, of both the sealing rings, by supplying seal gas to the space between the sealing end surfaces from a joined seal gas passage passing through the seal case and the stationary sealing ring; and
   a closing force generating means for generating a closing force that acts on the stationary sealing ring in a direction to close the space between the sealing end surfaces, thereby so as to keep the sealing end surfaces in a non-contact state by a balance of the opening force and the closing force; and wherein
   the closing force generating means, which does not use a spring, is so configured that an annular-spaced back pressure chamber is formed by blocking with two O-rings between the facing peripheral surfaces of the seal case and the stationary sealing ring to introduce thereinto a portion of the seal gas to be supplied to the seal gas passage or a portion of the seal gas flowing through the seal gas passage, so as to generate the closing force as a back pressure caused by the seal gas that acts on the stationary sealing ring; and
   a pressure keeping chamber is formed between the facing peripheral surfaces of the seal case and the stationary sealing ring, to generate a resistance force for preventing the stationary sealing ring from moving toward the rotary sealing ring by the seal gas introduced thereinto, and a seal gas introducing passage is formed in the stationary sealing ring, to make the pressure keeping chamber communicate with the back pressure chamber or the communication space and has a throttle disposed therein, so that the stationary sealing ring is prevented from moving rapidly toward the rotary sealing ring when supply of the seal gas stops; and wherein
   the seal gas passage includes an annular-spaced communication space which is formed between the facing peripheral surfaces of the seal case and the stationary sealing ring by blocking with the two O-rings mounted between the facing peripheral surfaces, a case-side passage that passes through the seal case provided with an upstream end connected to the seal gas supply passage and a downstream end opened to the communication space, a static pressure generating groove that is formed in the sealing end surface of the stationary sealing ring, a sealing ring-side passage that passes through the stationary sealing ring provided with an upstream end opened to the communication space and a downstream end opened to the static pressure generating groove, and a throttle that is disposed in the sealing ring-side passage; and
   the back pressure chamber is also used as the communication space of the seal gas passage.

2. A static pressure type non-contact gas seal including:
   a tubular seal case;
   a rotary sealing ring fixed to a rotary member;
   a stationary sealing ring held to be axially movable in the seal case with facing the rotary sealing ring;
   an opening force generating means for generating an opening force that acts on the stationary sealing ring in a direction to open the space between the facing end surfaces, serving as the sealing end surfaces, of both the sealing rings, by supplying seal gas to the space between the sealing end surfaces from a joined seal gas passage passing through the seal case and the stationary sealing ring; and
   a closing force generating means for generating a closing force that acts on the stationary sealing ring in a direction to close the space between the sealing end surfaces, thereby so as to keep the scaling end surfaces in a non-contact state by a balance of the opening force and the closing force; and wherein
   the closing force generating means, which does not use a spring, is so configured that an annular-spaced back pressure chamber is formed by blocking with two O-rings between the facing peripheral surfaces of the seal case and the stationary sealing ring to introduce thereinto a portion of the seal gas to be supplied to the seal gas passage or a portion of the seal gas flowing through the seal gas passage, so as to generate the closing force as a back pressure caused by the seal gas that acts on the stationary sealing ring; and a pressure keeping chamber is formed between the facing peripheral surfaces of the seal case and the stationary sealing ring, to generate a resistance force for preventing the stationary sealing ring from moving toward the rotary sealing ring by the seal gas introduced thereinto, and a seal gas introducing passage is formed in the stationary sealing ring, to make the pressure keeping chamber communicate with the back pressure chamber or the communication space and has a throttle disposed therein so that the stationary sealing ring is prevented from moving rapidly toward the rotary sealing ring when supply of the seal gas stops; and wherein the seal gas passage includes an annular-spaced communication space which is formed between the facing peripheral surfaces of the seal case and the stationary sealing ring by blocking with the two O-rings mounted between the facing peripheral surfaces, a case-side passage that passed through the seal ease provided with an upstream end connected to the seal gas supply passage and a downstream end opened to the communication space, a static pressure generating groove that is formed in the sealing end surface of the stationary sealing ring, a sealing ring-side passage that passes through the stationary sealing ring provided with an upstream end opened to the communication space and a downstream end opened to the static pressure generating groove, and a throttle that is disposed in the sealing ring-side passage; and first, second and third O-rings are disposed between the facing peripheral surfaces of the seal case and the stationary sealing ring, so as to form therebetween the communication space of the seal gas passage that is blocked with the first and the second O-rings and the back pressure chamber that is blocked with the second and the third O-rings respectively, whereby the portion of the seal gas to be supplied to the seal gas passage from the seal gas supply passage is introduced into the back pressure chamber.

* * * * *